United States Patent
Li et al.

(10) Patent No.: US 11,595,808 B2
(45) Date of Patent: Feb. 28, 2023

(54) SIGNAL RECEIVING METHOD AND TERMINAL DEVICE

(71) Applicant: Huawei Technologies Co., Ltd., Shenzhen (CN)

(72) Inventors: Jifeng Li, Shanghai (CN); Li Shen, Beijing (CN); Wenyu Gan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/058,540

(22) PCT Filed: May 24, 2018

(86) PCT No.: PCT/CN2018/088131
§ 371 (c)(1),
(2) Date: Nov. 24, 2020

(87) PCT Pub. No.: WO2019/222954
PCT Pub. Date: Nov. 28, 2019

(65) Prior Publication Data
US 2021/0127256 A1 Apr. 29, 2021

(51) Int. Cl.
*H04W 8/18* (2009.01)
*H04W 72/12* (2009.01)
(Continued)

(52) U.S. Cl.
CPC ............ *H04W 8/18* (2013.01); *H04W 72/12* (2013.01); *H04W 84/042* (2013.01); *H04W 88/06* (2013.01)

(58) Field of Classification Search
CPC  H04B 1/3816; H04M 2250/14; H04W 8/183; H04W 12/06; H04W 12/062;
(Continued)

(56) References Cited

U.S. PATENT DOCUMENTS 9,386,626 B1 * 7/2016 Hsu ..................... H04J 13/00
9,521,563 B2 * 12/2016 Su ....................... H04L 69/18
(Continued)

FOREIGN PATENT DOCUMENTS

CN  101827463 A  9/2010
CN  101827464 A  9/2010
(Continued)

OTHER PUBLICATIONS

Pathak et al,, "Protocol for Reduction in Network Resource Wastage for 4G Dual SIM Dual Standby User Equipment," 2018 15th IEEE Annual Consumer Communications & Networking Conference (CCNC), Total 4 pages, Institute of Electrical and Electronics Engineers, New York, New York (Mar. 2018).

*Primary Examiner* — Matthew C Sams
(74) *Attorney, Agent, or Firm* — Leydig, Voit & Mayer, Ltd.

(57) ABSTRACT

This application provides a signal receiving method and a terminal device, to improve user experience. The method is applied to a terminal device provided with a plurality of subscriber identification module SIM cards, the terminal device is provided with a plurality of receive antennas, and the method includes: switching from a first mode to a second mode when a channel environment of a first SIM card meets a preset condition, where the first SIM card is a SIM card configured to receive a high-priority signal, the high-priority signal includes a paging message, a system message, or downlink signaling in a signaling interaction procedure, and a quantity of receive antennas configured for the first SIM card in the first mode is different from a quantity of receive antennas configured for the first SIM card in the second mode.

18 Claims, 6 Drawing Sheets

(51) Int. Cl.
*H04W 84/04* (2009.01)
*H04W 88/06* (2009.01)

(58) Field of Classification Search
CPC ............. H04W 12/065; H04W 12/068; H04W 12/069; H04W 88/02
See application file for complete search history.

(56) References Cited

U.S. PATENT DOCUMENTS

| | | | | |
|---|---|---|---|---|
| 9,768,825 | B2* | 9/2017 | Wang | H04B 7/0817 |
| 10,164,701 | B2* | 12/2018 | Lan | H04W 88/06 |
| 10,862,571 | B2* | 12/2020 | Wang | H04B 7/0871 |
| 2014/0133427 | A1* | 5/2014 | Kim | H04L 5/0053 370/329 |
| 2014/0308986 | A1* | 10/2014 | Yang | H04W 36/0088 455/552.1 |
| 2015/0264743 | A1* | 9/2015 | Yan | H04B 7/0814 455/553.1 |
| 2015/0282057 | A1* | 10/2015 | Li | H04B 7/0871 455/552.1 |
| 2015/0282237 | A1* | 10/2015 | Su | H04W 76/16 455/552.1 |
| 2016/0134317 | A1* | 5/2016 | Hu | H04W 68/02 455/558 |
| 2016/0226539 | A1 | 8/2016 | Batchu et al. | |
| 2016/0316378 | A1* | 10/2016 | Su | H04W 24/02 |
| 2016/0365879 | A1* | 12/2016 | Soliman | H04B 1/0053 |
| 2017/0215137 | A1 | 7/2017 | Liu et al. | |
| 2017/0295513 | A1* | 10/2017 | Lee | H04W 40/12 |
| 2018/0083690 | A1* | 3/2018 | Lan | H04B 7/08 |
| 2018/0227880 | A1* | 8/2018 | Su | H04W 76/27 |
| 2018/0331714 | A1* | 11/2018 | See | H04B 1/58 |
| 2021/0014666 | A1* | 1/2021 | Baskar | H04L 5/0055 |
| 2021/0127256 | A1* | 4/2021 | Li | H04W 60/005 |

FOREIGN PATENT DOCUMENTS

| | | |
|---|---|---|
| CN | 101951287 A | 1/2011 |
| CN | 103379672 A | 10/2013 |
| CN | 103731889 A | 4/2014 |
| CN | 104822163 A | 8/2015 |
| CN | 105979501 A | 9/2016 |
| CN | 106130618 A * | 11/2016 |
| CN | 106792787 A | 5/2017 |

* cited by examiner

SIGNAL RECEIVING METHOD AND TERMINAL DEVICE

CROSS-REFERENCE TO RELATED APPLICATIONS

This application is a national stage of International Application No. PCT/CN2018/088131, filed on May 24, 2018, which is hereby incorporated by reference in its entirety.

TECHNICAL FIELD

This application relates to the communications field, and more specifically, to a signal receiving method and a terminal device.

BACKGROUND

A dual-SIM phone is a terminal device widely used currently. A dual-SIM mode means that two subscriber identification module (SIM) cards may be used concurrently in a same mobile phone, in other words, in a same terminal device. With development of technologies, a terminal device with more SIM cards may appear.

However, in consideration of costs, limited radio frequency resources and baseband resources in a terminal device are used to receive and send a signal. The dual-SIM mobile phone is used as an example. Two SIM cards in a same mobile phone may share radio frequency resources and baseband resources in some cases, but in some other cases, need to exclusively occupy resources to receive and send a signal.

Therefore, how to properly allocate hardware resources to SIM cards to improve user experience becomes an urgent technical problem to be resolved.

SUMMARY

This application provides a signal receiving method and a terminal device, to improve user experience.

According to a first aspect, a signal receiving method is provided, where the method is applied to a terminal device provided with a plurality of SIM cards, the terminal device is provided with a plurality of receive antennas, and the method includes:

switching from a first mode to a second mode when a channel environment of a first SIM card meets a preset condition, where the first SIM card is a SIM card configured to receive a high-priority signal, the high-priority signal includes a paging message, a system message, or downlink signaling in a signaling interaction procedure, and a quantity of receive antennas configured for the first SIM card in the first mode is different from a quantity of receive antennas configured for the first SIM card in the second mode.

In this embodiment of this application, the first mode and the second mode may be two different resource scheduling modes.

Based on the foregoing technical solution, when the first SIM card needs to receive the high-priority signal, the multi-SIM terminal device performs pre-determining with reference to a current resource scheduling mode and the channel environment, to determine whether the resource scheduling mode needs to be changed to receive the high-priority signal. When the channel environment of the first SIM card is relatively poor, for example, meets the preset condition, the terminal device may adjust a quantity of receive antennas allocated to the first SIM card, for example, increase the quantity of receive antennas allocated to the first SIM card, to implement a diversity gain, to help improve receiving quality of the high-priority signal. Therefore, an event such as missing a call or being disconnected from a network can be avoided as much as possible, to improve user experience.

With reference to the first aspect, in some implementations of the first aspect, the method further includes:
receiving the high-priority signal in the second mode.

With reference to the first aspect, in some implementations of the first aspect, the method further includes:
determining a first time period for receiving the high-priority signal.

After determining the first time period for receiving the high-priority signal, the terminal device may switch from the first mode to the second mode before the first time period or at an initial moment of the first time period, to receive the high-priority signal.

According to a second aspect, a paging message receiving method is provided, where the method is applied to a terminal device provided with a plurality of SIM cards, the terminal device is provided with a plurality of receive antennas, and the method includes:

switching from a first mode to a second mode when a channel environment of a first SIM card meets a preset condition, where the first SIM card is a SIM card configured to receive a paging message, and a quantity of receive antennas configured for the first SIM card in the first mode is different from a quantity of receive antennas configured for the first SIM card in the second mode.

In this embodiment of this application, the first mode and the second mode may be two different resource scheduling modes.

Based on the foregoing technical solution, when the first SIM card needs to receive the paging message, the multi-SIM terminal device performs pre-determining with reference to a current resource scheduling mode and the channel environment, to determine whether the resource scheduling mode needs to be changed to receive the paging message. When the channel environment of the first SIM card is relatively poor, for example, meets the preset condition, the terminal device may adjust a quantity of receive antennas allocated to the first SIM card, for example, increase the quantity of receive antennas allocated to the first SIM card, to implement a diversity gain, to help improve receiving quality of the paging message. Therefore, an event in which a call is missed can be avoided as much as possible, to improve user experience.

With reference to the second aspect, in some implementations of the second aspect, the method further includes:
receive the paging message in the second mode.

With reference to the second aspect, in some implementations of the second aspect, the method further includes:
determining a first time period for receiving the paging message.

Specifically, the terminal device may calculate, based on cell-level common information carried in a system message and SIM card information of the terminal device, the first time period for receiving the paging message, and may switch from the first mode to the second mode before the first time period or at an initial moment of the first time period based on the determined first time period, to receive the paging message.

With reference to the first aspect or the second aspect, in some implementations, the quantity of receive antennas configured for the first SIM card in the first mode is less than the quantity of receive antennas configured for the first SIM card in the second mode; and the method further includes:

determining, based on the channel environment of the first SIM card, whether to switch from the first mode to the second mode.

Specifically, when the channel environment of the first SIM card meets the preset condition, the terminal device switches from the first mode to the second mode; or when the channel environment of the first SIM card does not meet the preset condition, the terminal device remains in the first mode.

The channel environment of the first SIM card is compared with the preset condition, to determine whether the channel environment is good. When the channel environment is relatively poor, the terminal device may switch from the first mode to the second mode, and increase a quantity of receive antennas configured for the first SIM card, to obtain a diversity gain, improve receiving quality of the high-priority signal, and avoid occurrence of an event such as missing a call or being disconnected from a network. When the channel environment is relatively good, the terminal device may remain in the first mode to receive the high-priority signal without switching to the second mode. In this case, the quantity of receive antennas allocated to the first SIM card can be reduced, and resources are allocated to another SIM card for use, so that an event in which a call is missed when a multi-SIM call occurs can be avoided. Therefore, in general, user experience can be improved. In addition, the terminal device can flexibly switch between different resource scheduling modes based on the channel environment, to reach a compromise between performance and costs.

Optionally, the preset condition includes:

a signal-to-noise ratio SNR is less than or equal to a first preset threshold; and/or received energy of a signal is less than or equal to a second preset threshold.

It should be understood that the signal-to-noise ratio and the received energy of the signal may be used as two possible parameters for determining channel environment quality, but should not constitute any limitation on this application. An evaluation parameter of the channel environment quality is not limited in this application.

With reference to the first aspect or the second aspect, in some implementations, the quantity of receive antennas configured for the first SIM card in the first mode is greater than the quantity of receive antennas configured for the first SIM card in the second mode; and the method further includes:

determining, based on the channel environment of the first SIM card, whether to switch from the first mode to the second mode.

Specifically, when the channel environment of the first SIM card meets the preset condition, the terminal device switches from the first mode to the second mode; or when the channel environment of the first SIM card does not meet the preset condition, the terminal device remains in the first mode.

When the quantity of receive antennas configured for the first SIM card in the first mode is greater than the quantity of receive antennas configured for the first SIM card in the second mode, a mode may be adjusted in a relatively good channel environment, to reduce a quantity of receive antennas configured for the first SIM card, so as to be used for downlink receiving performed by another SIM card. In this way, an event in which a call is missed when the another SIM card is called can be avoided. When the channel environment is relatively poor, the terminal device remains in the first mode, to ensure receiving quality of the high-priority signal, and to avoid occurrence of an event in which a call is missed or a network is disconnected. Therefore, user experience can be maximized.

Optionally, the preset condition includes:

a signal-to-noise ratio SNR is greater than a third preset threshold; and/or the received energy of the signal is greater than a fourth preset threshold.

It should be understood that the signal-to-noise ratio and the received energy of the signal may be used as two possible parameters for determining channel environment quality, but should not constitute any limitation on this application. An evaluation parameter of the channel environment quality is not limited in this application.

With reference to the first aspect or the second aspect, in some implementations, the terminal device is a dual-SIM terminal, the first mode is a dual receive dual SIM dual standby (DR-DSDS) mode and the second mode is a dual SIM dual standby (DSDS) mode.

Therefore, for the dual-SIM terminal, resources may be dynamically allocated to two SIM cards based on service priorities of the two SIM cards with reference to the channel environment, so that the dual-SIM terminal can flexibly switch between different resource scheduling modes based on factors such as the service priorities and the channel environment, to avoid, as much as possible, occurrence of an event such as missing a call or being disconnected from a network. Therefore, user experience is improved.

With reference to the first aspect or the second aspect, in some implementations, two SIM cards in the terminal device work in a same network standard, the terminal device includes two radio frequency processing modules configured to receive signals in the network standard, and each radio frequency processing module includes one or more receive antennas.

To implement a dual receive dual SIM dual standby resource scheduling mode in a unified network standard, the terminal device may configure two sets of radio frequency resources and two sets of baseband resources for a same network standard, so that the terminal device not only can implement the dual receive dual SIM dual standby mode in different network standards, but also can implement the dual receive dual SIM dual standby mode in a same network standard.

With reference to the first aspect or the second aspect, in some implementations, if the quantity of receive antennas configured for the first SIM card in the first mode is less than the quantity of receive antennas configured for the first SIM card in the second mode, before determining to switch from the first mode to the second mode to receive the high-priority signal, the method further includes:

determining that a second SIM card in the two SIM cards does not receive the high-priority signal in the first time period.

In consideration of costs, usually, to implement the dual receive dual SIM dual standby mode in a same network standard, one set of radio frequency resources and one set of baseband resources are configured for each SIM card. However, when a quantity of receive antennas configured for the first SIM card needs to be increased, because the receive antenna is a part of radio frequency resources, in other words, another set of radio frequency resources is also allocated to the first SIM card for use, no radio frequency resource can be used by the second SIM card currently, in other words, the dual receive dual SIM dual standby mode is switched to the dual SIM dual standby mode. Therefore, before switching, it needs to be first determined that the second SIM card does not receive the high-priority signal in the first time period, to avoid occurrence of an event in which the second SIM card misses a call or is disconnected from a network.

With reference to the first aspect or the second aspect, in some implementations, the network standard is a long term evolution LTE standard.

In consideration that a user works in a dual-SIM LTE standard for more time, to maximize user experience, two sets of radio frequency resources and two sets of baseband resources that are used for receiving may be configured for the LTE standard, to implement the dual receive dual SIM dual standby mode in the LTE standard.

It should be understood that the LTE standard is proposed only to adapt to a current market requirement. A possibility of configuring two or more sets of resources for another network standard in the future to implement the dual receive dual SIM dual standby mode in the another network standard is excluded in this application. This is not limited in this embodiment of this application.

According to a third aspect, a terminal device is provided. The terminal device has functions of implementing the terminal device in the method designs of the first aspect or the second aspect. These functions may be implemented by hardware, or may be implemented by hardware executing corresponding software. The hardware or the software includes one or more units corresponding to the foregoing functions.

According to a fourth aspect, a terminal device is provided, and includes a transceiver and a processor. Optionally, the terminal device further includes a memory. The processor is configured to control the transceiver to receive and send a signal. The memory is configured to store a computer program. The processor is configured to: invoke the computer program from the memory, and run the computer program, so that the terminal device is enabled to perform the method performed by the terminal device in the method designs of the first aspect or the second aspect.

According to a fifth aspect, a chip system is provided, and includes a processor, configured to: invoke a computer program from a memory, and run the computer program, so that a device in which the chip system is installed performs the method according to the first aspect or the second aspect. Optionally, the chip system further includes the memory.

According to a sixth aspect, a computer-readable medium is provided, and includes an instruction. When the instruction runs on a terminal device, the terminal device is enabled to the method according to the first aspect or the second aspect.

According to a seventh aspect, a computer program product is provided, and includes an instruction. When the instruction runs on a terminal device, the terminal device is enabled to the method according to the first aspect or the second aspect.

DESCRIPTION OF EMBODIMENTS

The following describes technical solutions of this application with reference to accompanying drawings.

The technical solutions in the embodiments of this application may be applied to various terminal devices (also referred to as user equipment) that may be provided with a plurality of SIM cards, for example, a mobile phone, a band, a telephone watch, a tablet computer, a notebook computer, and an ultra-mobile personal computer (UMPC), a personal digital assistant (PDA) device, a point of sales (POS), a handheld device with a wireless communication function, a computing device, another processing device connected to a wireless modem, a vehicle-mounted device, and a wearable device, which are not limited to a communications terminal.

Figure 1:
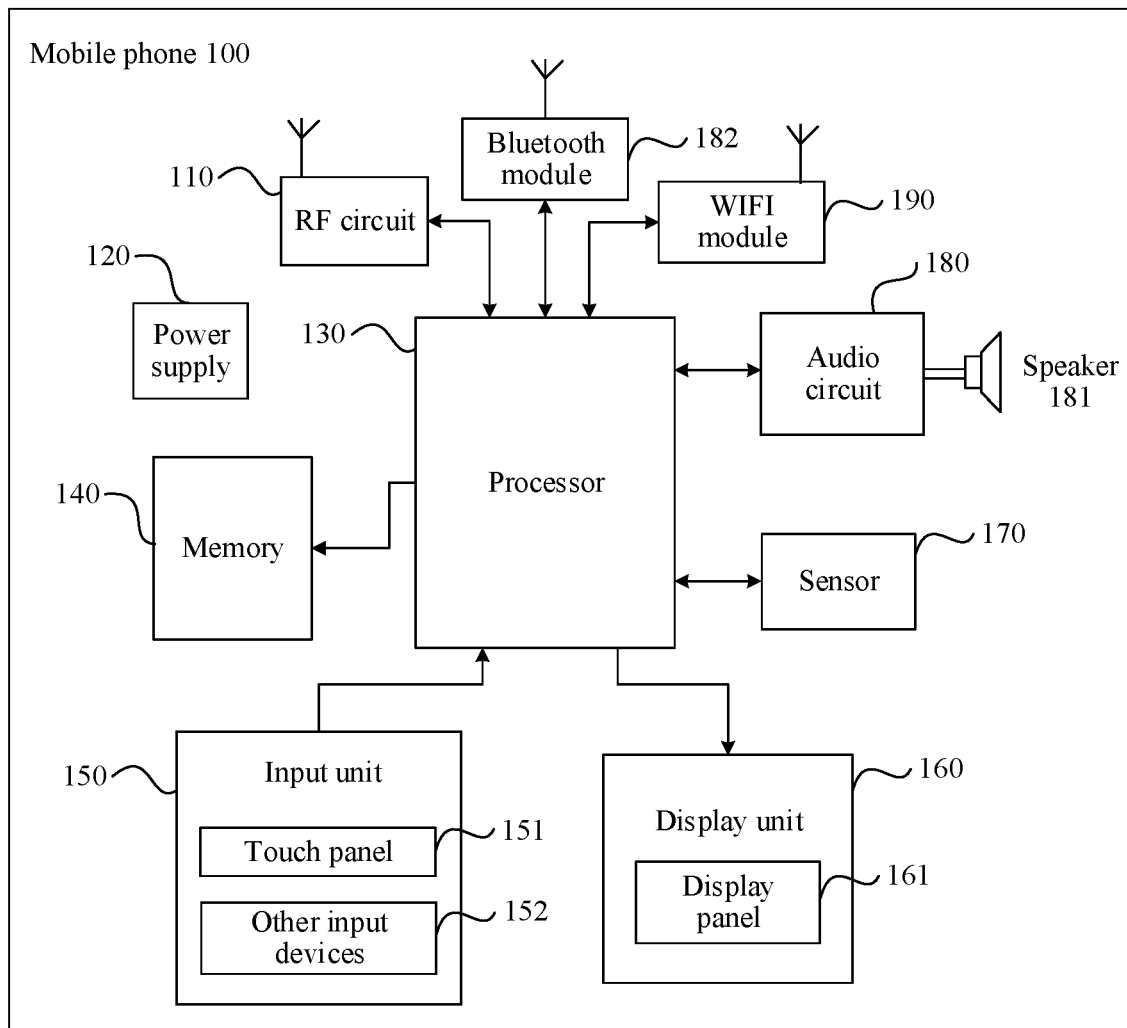
FIG. 1 is a schematic structural diagram of a mobile phone that is applicable to a signal receiving method according to an embodiment of this application.

For ease of understanding of the embodiments of this application, a mobile phone 100, shown in FIG. 1, is first used as an example to describe the terminal device to which the embodiments of this application are applicable. FIG. 1 is a schematic structural diagram of a mobile phone that is applicable to a method according to an embodiment of this application. As shown in the figure, the mobile phone 100 may include components such as a radio frequency (RF) circuit 110, a power supply 120, a processor 130, a memory 140, an input unit 150, a display unit 160, a sensor 170, an audio circuit 180, and a wireless fidelity (WIFI) module 190. A person skilled in the art may understand that a structure of the mobile phone shown in FIG. 1 does not constitute a limitation on the mobile phone. The mobile phone may include more or fewer components than those shown in the figure, or may include a combination of some components, or may include different component arrangements.

The following describes in detail each constituent component of the mobile phone 100 with reference to FIG. 1.

The radio frequency circuit 110 may be configured to receive and send a signal in an information receiving and sending process or in a call process. Particularly, after receiving downlink information from a base station, the RF circuit 110 sends the downlink information to the processor 130 for processing. In addition, the RF circuit 110 sends uplink data to the base station. Usually, the RF circuit 110 includes, but is not limited to, an antenna, at least one amplifier, a transceiver, a coupler, a low noise amplifier (LNA), a duplexer, and the like. Briefly, the RF circuit 110 may include a radio frequency front-end (RF FE) and an antenna. The radio frequency front-end is related to a frequency band, and different frequency bands may correspond to different radio frequency front-ends.

The RF circuit 110 may further communicate with a network and another device through wireless communication. Any communications standard or protocol may be used for the wireless communication, including but not limited to a global system for mobile communications (GSM), a general packet radio service (GPRS), code division multiple access (CDMA), wideband code division multiple access (WCDMA), long term evolution (LTE), a 5th generation (5G), an email, a short message service (SMS), and the like.

The memory 140 may be configured to store a software program and a module. The processor 130 runs the software program and the module that are stored in the memory 140, to execute various functions of the mobile phone 100 and perform data processing. The memory 140 may mainly include a program storage area and a data storage area. The program storage area may store an operating system, an application program required by at least one function (such as a sound playing function and an image playing function), and the like. The data storage area may store data (such as audio data and a phone book) created based on use of the mobile phone 100, and the like. In addition, the memory 140 may include a high-speed random access memory, or may include a nonvolatile memory, for example, at least one magnetic disk storage device, a flash storage device, or another volatile solid-state storage device.

The input unit 150 may be configured to: receive an entered digit or entered character information, and generate a key signal input related to user setting and function control of the mobile phone 100. Specifically, the input unit 150 may include a touch panel 151 and other input devices 152. The touch panel 151, also referred to as a touchscreen, may collect a touch operation performed by a user on or near the touch panel 151 (such as an operation performed by the user on the touch panel 151 or near the touch panel 151 by using any suitable object or accessory such as a finger or a stylus), and drive a corresponding connection apparatus based on a preset program. Optionally, the touch panel 151 may include two parts: a touch detection apparatus and a touch controller. The touch detection apparatus detects a touch direction of the user, detects a signal generated by the touch operation, and transfers the signal to the touch controller. The touch controller receives touch information from the touch detection apparatus, converts the touch information into touch point coordinates, and sends the touch point coordinates to the processor 130. Moreover, the touch controller can receive and execute a command sent by the processor 130. In addition, the touch panel 151 may be implemented in a plurality of types such as a resistive type, a capacitive type, an infrared type, and a surface acoustic wave type. The input unit 150 may include other input devices 152 in addition to the touch panel 151. Specifically, the other input devices 152 may include but are not limited to one or more of a physical keyboard, a function key (for example, a volume control key or an on/off key), a trackball, a mouse, a joystick, and the like.

The display unit 160 may be configured to display information entered by the user or information provided for the user, and various menus of the mobile phone 100. The display unit 160 may include a display panel 161. Optionally, the display panel 161 may be configured in a form of an LCD, an OLED, or the like. Further, the touch panel 151 may cover the display panel 161. When detecting the touch operation on or near the touch panel 151, the touch panel 151 transmits the touch operation to the processor 130 to determine a type of a touch event, and then the processor 130 provides corresponding visual output on the display panel 161 based on the type of the touch event. In FIG. 1, the touch panel 151 and the display panel 161 are used as two independent components to implement input and input functions of the mobile phone 100. However, in some embodiments, the touch panel 151 and the display panel 161 may be integrated to implement the input and output functions of the mobile phone 100.

The audio circuit 180 and a speaker 181 may provide an audio interface between the user and the mobile phone 100. The audio circuit 180 may convert received audio data into an electrical signal and then transmit the electrical signal to the speaker 181, and the speaker 181 converts the electrical signal into an audio signal for outputting. In addition, a microphone 182 converts a captured audio signal into an electrical signal, and the audio circuit 180 receives the electrical signal and converts the electrical signal into audio data and then outputs the audio data to the RF circuit 110; and then the audio data is transmitted to another mobile phone, or the audio data is output to the memory 140 for further processing.

A Bluetooth module 182 is a printed circuit board assembly (PCBA) with a Bluetooth function, and is configured to perform short-range wireless communication. The Bluetooth module 182 is divided into a Bluetooth data module and a Bluetooth voice module based on functions.

WIFI is a short-distance wireless transmission technology. By using the WIFI module 190, the mobile phone 100 may help the user send and receive an email, browse a web page, access streaming media, and the like. The WIFI module 190 provides wireless access to a broadband internet for the user. Although FIG. 1 shows the WIFI module 190, it can be understood that the WIFI module 190 is not a necessary part of the mobile phone 100, and may be totally omitted based on a requirement without changing the essence scope of this application.

The processor 130 is a control center of the mobile phone 100, is connected to various parts of the entire mobile phone by using various interfaces and lines, and runs or executes the software program and/or the module stored in the memory 140 and invokes data stored in the memory 140, to execute various functions of the mobile phone 100 and perform data processing, so as to implement various mobile phone-based services. Optionally, the processor 130 may include one or more processing units. Preferably, the processor 130 may integrate an application processor and a communication processor (communication CPU, CCPU). The application processor mainly processes an operating system, a user interface, an application program, and the like. The communications processor mainly processes wireless communication, for example, modulating or demodulating a signal. It may be understood that the modem processor may not be integrated into the processor 130. In this embodiment of this application, the communications processor may correspond to a baseband chip 210 described below with reference to FIG. 2.

The mobile phone 100 further includes the power supply 120 (for example, a battery) that supplies power to the components. Preferably, the power supply may be logically connected to the processor 130 by using a power supply management system, to implement functions such as charging management, discharging management, and power consumption management by using the power supply management system.

Although not shown, the mobile phone 100 may further include a camera, and the like. Details are not described herein.

It should be noted that the mobile phone shown in FIG. 1 is merely an example of a terminal device, and this is not particularly limited in this application. This embodiment of this application may be applied to an electronic device such as a mobile phone or a tablet computer. This is not limited in this application.

Before the embodiment of this application is described, several concepts in this application are first described briefly.

1. Network standard: The network standard indicates a network type, and may become a wireless standard or a radio access technology (RAT). A current network standard may mainly include a second generation (2G) standard, a 2.5th generation (2.5G) standard, a third generation (3G) standard, a fourth generation (4G) or long term evolution (LTE) standard, and a future 5th generation (5G) standard. 2G may be represented by a global system for mobile communications (GSM), 3G may be represented by code division multiple access (CDMA), time division-synchronous code division multiple access (TD-SCDMA), and wideband code division multiple access (WCDMA), and 4G may be represented by time division long term evolution (TD-LTE) and frequency-division duplex long term evolution (FDD-LTE).

Different network standards lead to a different baseband signal processing manner. Therefore, different instructions may be used for baseband processing in different network standards.

2. Dual SIM dual standby (DSDS) mode: Two SIM cards can be inserted simultaneously and support different network standards or a same network standard. The two SIM cards can be used simultaneously, and the two cards do not interfere with each other. Herein, that the two SIM cards do not interfere with each other may indicate that the two SIM cards choose to work on frequency bands that do not interfere with each other, or the two SIM cards work on a jamming frequency band, but an interference degree falls within an acceptable range.

In each network standard, the terminal device may be provided with only one radio frequency processing module for receiving and one baseband processing module for receiving. If the two SIM cards are in a same network standard, different SIM cards may receive and send signals by using the radio frequency processing module in a time division multiplexing manner.

Corresponding to different network standards, a terminal device supporting the dual SIM dual standby mode may be provided with a plurality of baseband processing modules for receiving. Corresponding to different frequency bands, the terminal device supporting the dual SIM dual standby mode may be provided with a plurality of radio frequency processing modules for receiving.

The radio frequency processing module and the baseband processing module may be understood as modules that are obtained through division and that are configured to execute different instructions to implement different functions. Specific functions of the modules may be implemented by hardware, or may be implemented by software, or may be implemented by a combination of software and hardware. For example, in this embodiment of this application, radio frequency processing modules with different functions may be implemented by using different radio frequency circuits, and baseband processing modules with different functions may be implemented by executing different instructions by a processor. In an actual form, the radio frequency processing modules with different functions may be integrated together, or may be discrete, and the baseband processing modules with different functions may be integrated together, or may be discrete. This is not limited in this embodiment of this application.

In the dual SIM dual standby mode, when one SIM card has a receiving task, the SIM card may exclusively occupy the radio frequency processing module for receiving and the baseband processing module for receiving, and the other SIM card cannot receive a downlink signal. When one SIM card has a sending task, the SIM card may exclusively occupy a radio frequency processing module for sending and a baseband processing module for sending, and the other SIM card cannot send an uplink signal.

3. Dual receive dual SIM dual standby (DR-DSDS) mode: Two SIM cards can be inserted simultaneously and support different network standards or a same network standard. The two SIM cards can be used simultaneously, and the two cards do not interfere with each other. In each network standard, the terminal device may be provided with at least one radio frequency processing module for receiving and at least one baseband processing module for receiving. In a network standard, if the terminal device is provided with two radio frequency processing modules for receiving and two baseband processing modules for receiving, the terminal device may support the dual receive dual SIM dual standby mode in the network standard. In a network standard, if the terminal device is provided with only one radio frequency processing module for receiving or is provided with only one baseband processing module for receiving, the terminal device may support only the dual SIM dual standby mode in the network standard.

Corresponding to different network standards, a terminal device supporting the dual receive dual SIM dual standby mode may be provided with a plurality of baseband processing modules for receiving. Corresponding to different frequency bands, the terminal device supporting the dual receive dual SIM dual standby mode may be provided with a plurality of radio frequency processing modules for receiving.

In the dual receive dual SIM dual standby mode, when the two SIM cards simultaneously have receiving tasks only, the two SIM cards each may receive a downlink signal by using one radio frequency processing module for receiving and a baseband processing module corresponding to a network standard; when one SIM card has a sending task, the SIM card may exclusively occupy a radio frequency processing module for receiving and a baseband processing module for receiving, and the other SIM card cannot send an uplink signal; or when one SIM card has a receiving task and the other SIM card has a sending task, the two SIM cards may receive and send a signal by using corresponding processing modules.

It should be noted that the dual SIM dual standby mode and the dual receive dual SIM dual standby mode are two modes in which the terminal device schedules a resource, and are strongly related to resources configured in different network standards. In different network standards, a same terminal device may schedule resources in different modes.

It should be further noted that in this embodiment of this application, the radio frequency processing module may be a module that processes a signal on a radio frequency band, for example, performs frequency modulation processing, signal amplification, or filtering. The baseband processing module may be a module that processes a signal on a baseband, for example, performs modulation or demodulation processing. One radio frequency processing module and one baseband processing module can independently complete one time of signal receiving or sending. Specific functions of the radio frequency processing module and the baseband processing module may be implemented by reading a corresponding instruction by the processor, or may be implemented by using a dedicated circuit. A specific form of the radio frequency processing module or the baseband processing module is not limited in this application.

It should be further noted that in the prior art, a receive antenna may correspond to a radio frequency front-end, and a signal received by a receive antenna in a same radio frequency processing module is sent to a corresponding radio frequency front-end. Therefore, when the receive antenna is exclusively occupied by one SIM card, the corresponding radio frequency front-end is also exclusively occupied by the SIM card. In other words, the radio frequency processing module is exclusively occupied by the SIM card. However, a possibility of decoupling the receive antenna from the radio frequency front-end is not excluded in this application. Receive antennas in two radio frequency processing modules may be used by different SIM cards to receive signals, and the signals received by the two SIM cards by using the receive antennas may be sent to a same radio frequency front-end. In other words, the two SIM cards can share a same radio frequency front-end, and may further share a same baseband processing module in a same network standard. This is not limited in this embodiment of this application.

Figure 2:
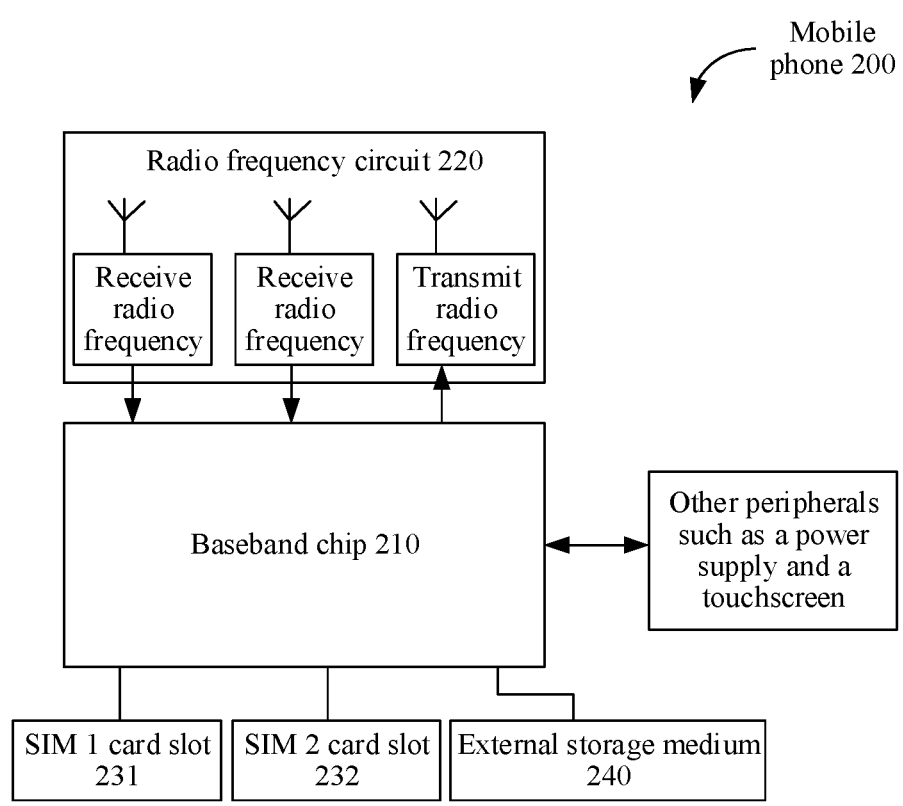
FIG. 2 is another schematic structural diagram of a mobile phone that is applicable to a signal receiving method according to an embodiment of this application.

For ease of understanding, the following describes in detail a difference between a dual SIM dual standby mode and a dual receive dual SIM dual standby mode with reference to FIG. 2. FIG. 2 is another schematic structural diagram of a mobile phone 200 that is applicable to a method according to an embodiment of this application. As shown in the figure, the mobile phone 200 may include a baseband chip 210, a radio frequency circuit 220, and other peripherals such as a SIM 1 card slot 231, a SIM 2 card slot 232, an external storage medium 240, a power supply, and a touchscreen.

The baseband chip 210 may be configured to carry a baseband resource used for modulation and demodulation, and is configured to perform modulation or demodulation processing on a baseband signal. The baseband chip 210 may correspond to, for example, the modem processor in the processor 130 described above with reference to FIG. 1. The baseband chip 210 may be integrated with an application processor, or may be separated from the application processor. This is not limited in the embodiments of this application.

The radio frequency circuit 220 may be configured to: receive a downlink service, and send an uplink service. The radio frequency circuit 220 corresponds to, for example, the radio frequency circuit 110 described above with reference to FIG. 1. A specific function of the radio frequency circuit 220 and a component included in the radio frequency circuit 220 are described in detail above. For brevity, details are not described herein again.

The SIM 1 card slot 231 and the SIM 2 card slot 232 are respectively configured to install two SIM cards, and may be connected to the application processor by using a connector. The application processor is connected to a communications processor. Therefore, the SIM cards may be communicatively connected to the communications processor. Herein, the SIM card may include a common SIM card, a micro-SIM card, or a nano-SIM card. A type of the SIM card is not limited in this application.

The external storage medium 240 may be configured to store a software program and a module. The external storage medium 240 may correspond to, for example, the memory 140 described above with reference to FIG. 1. In this embodiment of this application, the external storage medium 240 may be configured to store instructions executed by the baseband chip 210 and the radio frequency circuit 220, so that the baseband chip 210 and the radio frequency circuit 220 obtain corresponding instructions from the external storage medium 240, to complete signal processing. A function and a possible form of the external storage medium 240 are described in detail above with reference to the memory 140. For brevity, details are not described herein again.

In addition, other peripherals such as the power supply and the touchscreen are also described in detail above with reference to FIG. 1. For brevity, details are not described herein again.

In this embodiment of this application, to support concurrent use of two cards, corresponding to different operating frequency bands, the radio frequency circuit 220 may be divided into a plurality of radio frequency processing modules; and corresponding to different network standards, the baseband chip 210 may be divided into a plurality of baseband processing modules. Corresponding to an uplink direction and a downlink direction of a signal, the plurality of radio frequency processing modules may include a radio frequency processing module configured to send an uplink service (which may correspond to a transmit radio frequency in FIG. 2) and a radio frequency processing module configured to receive a downlink service (which corresponds to a receive radio frequency in FIG. 2). Because sending of an uplink signal is not involved in this embodiment of this application, a configuration of a radio frequency processing module configured to send the uplink service is not limited in this application. For ease of description, in the embodiments shown below, unless otherwise specified, the radio frequency processing module may be a radio frequency processing module configured to receive the downlink service.

Specifically, to correspond to different network standards, the dual-SIM mobile phone may include a plurality of baseband processing modules, to perform demodulation processing on downlink signals received in different network standards. It should be understood that the plurality of baseband processing modules may be integrated into a same baseband chip, for example, the baseband chip 210, or may be discretely disposed on different baseband chips. This is not limited in this application. For ease of understanding only, a case in which the plurality of baseband processing modules are integrated into a same baseband chip is shown in the figure.

Further, if the mobile phone supports the dual SIM dual standby mode, the mobile phone 200 may include one radio frequency processing module. The radio frequency processing module may be configured to: receive a downlink signal in different network standards, process the signal, and send the processed signal to a baseband processing module corresponding to a network standard.

If the mobile phone supports the dual receive dual SIM dual standby mode, the mobile phone 200 may include two or more radio frequency processing modules. When two SIM cards simultaneously have receiving tasks, one radio frequency processing module may be allocated to one SIM card for use, and the other radio frequency processing module may be allocated to the other SIM card for use.

As described above, the radio frequency circuit 220 may include an antenna. The dual-SIM mobile phone may be provided with at least one receive antenna. If the mobile phone supports the dual SIM dual standby mode, the dual-SIM mobile phone may be provided with only one receive antenna, or may be provided with a plurality of receive antennas. When either of two SIM cards has a receiving task, the one or more receive antennas are all exclusively occupied by the SIM card that has the receiving task, to receive the downlink signal. If the mobile phone supports the dual receive dual SIM dual standby mode, the dual-SIM mobile phone may be provided with two or more receive antennas.

For example, for a dual-SIM mobile phone provided with two receive antennas, when the two SIM cards each have a receiving task, one receive antenna may be allocated to one SIM card for use, and the other receive antenna may be allocated to the other SIM card for use. Certainly, when two receive antennas are configured, and only one SIM card has a receiving task, both the receive antennas may be allocated, for use, to the SIM card that has the receiving task. In this case, it may be considered that a resource scheduling mode of the mobile phone is switched from the dual receive dual SIM dual standby mode to the dual SIM dual standby mode. However, this should not constitute any limitation on this application. When only one SIM card has a receiving task, only one receive antenna may be allocated, for use, to the SIM card that has a receiving task. This is not limited in this embodiment of this application.

It should be understood that in this embodiment of this application, for ease of understanding and description, each receive antenna may correspond to one radio frequency processing module. However, this should not constitute any limitation on this application. Actually, each radio frequency processing module may include one receive antenna, or may include a plurality of receive antennas. This is not limited in this application. For brevity, descriptions of a same or similar case are omitted below.

In this embodiment of this application, for ease of description, the radio frequency processing module for receiving may be referred to as a radio frequency resource, and the baseband processing module for receiving may be referred to as a baseband resource. It may be understood that the radio frequency resource and the baseband resource are resources used to process a signal. Herein, the resource is not limited to a hardware resource, and may further include an instruction executed by the hardware resource.

When there are both sufficient radio frequency resources and sufficient baseband resources, the dual-SIM mobile phone may work in the dual receive dual SIM dual standby mode, to improve user experience. However, in some cases, when one of the two SIM cards needs to receive important information, for example, a paging message, a system message, and downlink signaling in a signaling interaction procedure, relatively good receiving quality may not be obtained in the dual receive dual SIM dual standby mode. Consequently, an adverse event such as missing a call or being disconnected from a network may occur, and user experience is severely affected.

In view of this, this application provides a method, to properly allocate a resource to a SIM card, to improve user experience.

The following describes in detail a signal receiving method provided in this application with reference to the accompanying drawings. It should be understood that the embodiments shown below may be applied to the foregoing listed various terminal devices that can be provided with a plurality of SIM cards, but are not limited to the mobile phone shown in FIG. 1 or FIG. 2. It should be further understood that the foregoing dual-SIM mobile phone shown in FIG. 2 is merely an example, and should not constitute any limitation on this application. A quantity of SIM cards that can be configured for the terminal device is not limited in this application. For example, there may be three or four SIM cards.

It should be understood that the signal receiving method provided in the embodiments of this application may be performed by a processor configured in the terminal device, and the processor may be, for example, the processor 130 described above with reference to FIG. 1. Specifically, based on different implemented functions, the processor may include different processing modules, for example, an information input module configured to report a current working status (for example, uplink sending or downlink receiving, or a network standard) of each SIM card, or a resource scheduling module configured to allocate a hardware resource to each SIM card.

Figure 3:
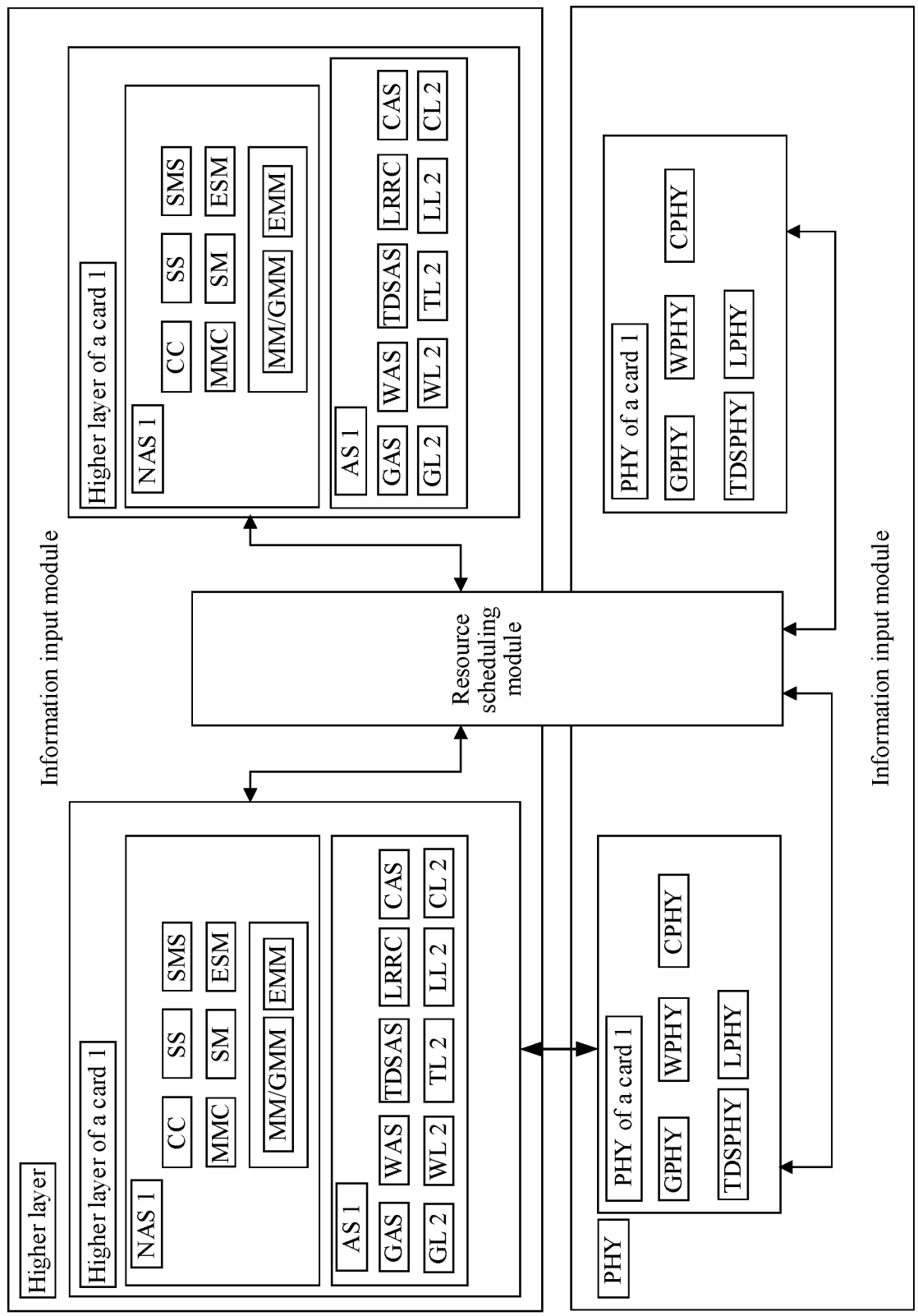
FIG. 3 is a logical diagram of software of a dual-SIM mobile phone that is applicable to a signal receiving method according to an embodiment of this application.

For ease of understanding, before the method provided in the embodiments of this application is described, modules used to implement the embodiments of this application are described in detail with reference to FIG. 3. FIG. 3 is a logical diagram of software of a dual-SIM mobile phone that is applicable to a signal receiving method according to an embodiment of this application. FIG. 3 shows a protocol stack (PS) of the dual-SIM mobile phone. The protocol stack may include a higher layer protocol stack and a physical (PHY) layer protocol stack. Each SIM card may include a non-access stratum (NAS) component and an access stratum (access stratum, AS) component of the SIM card.

An LTE protocol stack is used as an example. FIG. 3 shows call control (CC), a supplementary service (SS), a short message service (SMS), an MMC, an SM, mobility management (MM)/general packet radio service (GPRS) mobility management (GMM), evolved packet system (EPS) session management (ESM), EPS mobility management (EMM), and the like of a non-access stratum (NAS). In addition, FIG. 3 further shows a radio resource control (RRC) layer, a packet data convergence protocol (PDCP) layer, a radio link control (RLC) layer, a media access control (MAC) layer, a physical layer, and the like of an access stratum (AS).

A physical layer corresponding to each network standard may be a resource used for modulation and demodulation, in other words, may implement a function of a baseband chip. Corresponding to different network standards, the physical layer may include a PHY of an LTE standard (LPHY), a PHY of a TD-SCDMA standard (TPHY), a PHY of a CDMA2000 standard (CPHY), and a PHY of a WCDMA standard (WPHY).

It should be understood that each protocol layer and a function of the protocol layer described above with reference to FIG. 3 may be the same as those in the prior art. For brevity, detailed descriptions of specific functions of the protocol layer are omitted herein. It should be further understood that the function of the protocol layer may be implemented by using a processor. Based on different functions, the processor may be divided into different modules. Each protocol layer may be understood as a processing module having a corresponding function.

Still referring to FIG. 3, protocol stacks of a card 1 and a card 2 may be used to input service information (such as a network standard and a current service type) at a protocol stack layer to a resource scheduling module, to obtain service authorization. For example, physical layers of the card 1 and the card 2 may be used as information input modules to input service information at the physical layers to the resource scheduling module, or higher layers and the physical layers of the card 1 and the card 2 each may be used as an information input module to input service information at each protocol layer to the resource scheduling module. The resource scheduling module may determine, based on a baseband resource, a radio frequency resource, and service information that are configured for the dual-SIM mobile phone, whether to grant service authorization to both cards. The resource scheduling module may authorize only one SIM card, or may authorize both the cards. This is not limited in this embodiment of this application.

After determining to grant service authorization to both the cards, the resource scheduling module may first grant service authorization to both the cards at a protocol stack layer. A physical layer of a card that is authorized at the protocol stack layer may further apply to the resource scheduling module for specific baseband resources and radio frequency resources. The resource scheduling module may allocate baseband resources and radio frequency resources to both the cards based on the service authorization. Therefore, the SIM card that obtains the baseband resources and the radio frequency resources may perform respective receiving or sending tasks.

It should be understood that the foregoing describes in detail the processor configured to implement the signal receiving method in the embodiments of this application with reference to the logic diagram of software of the dual-SIM mobile phone in FIG. 3. However, this is merely an example of implementing the method in the embodiments of this application, and shall not constitute any limitation on this application. A possibility of implementing, by using other software logic, the signal receiving method provided in the embodiments of this application is not excluded in this application. In addition, when the terminal device may be provided with more SIM cards, a logic diagram of software similar to that in FIG. 3 may also be used to implement a same or similar function.

Figure 4:
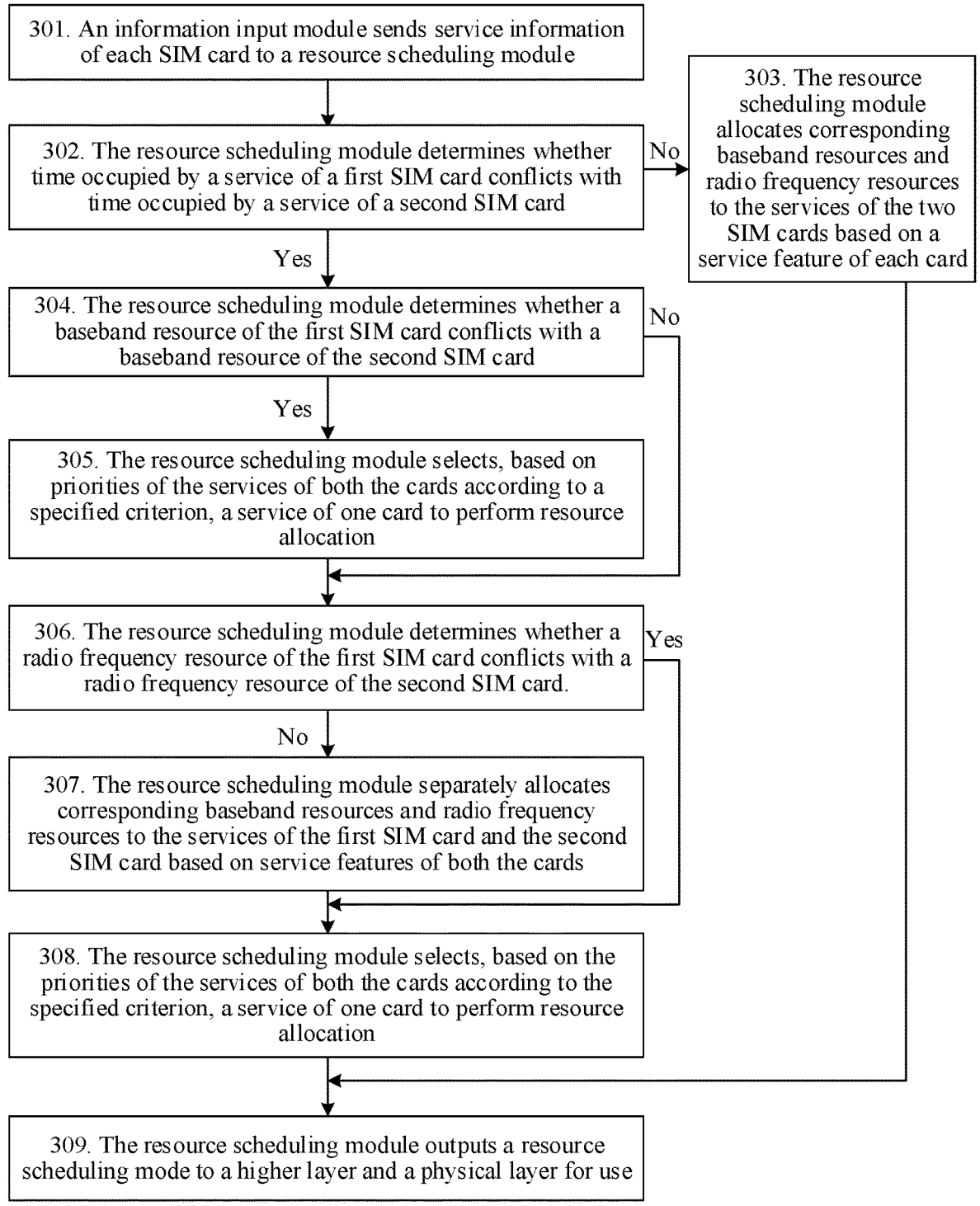
FIG. 4 is a schematic flowchart of a specific process of determining a resource scheduling mode according to an embodiment of this application.

For ease of understanding, the following describes in detail, with reference to FIG. 4, a specific process in which the foregoing modules determine a currently available resource scheduling mode.

It is assumed that the terminal device is a dual-SIM terminal, and includes a first SIM card and a second SIM card.

301. An information input module sends service information of each SIM card to a resource scheduling module. The service information may include, for example, a network standard, a working frequency, a service start time point and a service end time point, and whether a service requires an uplink resource.

302. The resource scheduling module determines whether time occupied by a service of the first SIM card conflicts with time occupied by a service of the second SIM card, in other words, whether the service of the card 1 and the service of the card 2 overlap in terms of time. If the service of the card 1 and the service of the card 2 overlap in terms of time, it is considered that the time occupied by the services of the two cards conflicts with each other, and step 304 is performed; or if the service of the card 1 and the service of the card 2 do not overlap in terms of time, it is considered that the time occupied by the services of the two cards does not conflict with each other, and step 303 is performed.

303. The resource scheduling module allocates corresponding baseband resources and radio frequency resources to the services of the two SIM cards based on a service feature of each card, and then performs step 309.

304. The resource scheduling module further determines whether a baseband resource of the first SIM card conflicts with a baseband resource of the second SIM card, and if the baseband resource of the first SIM card conflicts with the baseband resource of the second SIM card, performs step 305; or if the baseband resource of the first SIM card does not conflict with the baseband resource of the second SIM card, performs step 306.

305. The resource scheduling module selects, based on priorities of the services of both the cards according to a predefined criterion, a service of one card to perform resource allocation, and then performs step 309.

306. The resource scheduling module further determines whether a radio frequency resource of the first SIM card conflicts with a radio frequency resource of the second SIM card. If the radio frequency resource of the first SIM card does not conflict with the radio frequency resource of the second SIM card, 307 is performed; or if the radio frequency resource of the first SIM card conflicts with the radio frequency resource of the second SIM card, 308 is performed.

307. The resource scheduling module separately allocates corresponding baseband resources and radio frequency resources to the services of the first SIM card and the second SIM card based on service features of both the cards, and then performs step 309.

308. The resource scheduling module selects, based on the priorities of the services of both the cards according to the predefined criterion, a service of one card to perform resource allocation, and then performs step 309.

309. The resource scheduling module outputs a dual-card scheduling mode to each protocol layer, so that each protocol layer maintains the dual-card scheduling mode. The physical layer may perform resource configuration for receiving or sending based on a resource allocated by the resource scheduling module.

For example, it is assumed that the terminal device is provided with two sets of radio frequency resources and two sets of baseband resources for an LTE standard, and is provided with one set of radio frequency resources and one set of baseband resources for each of a 3G standard and a 2G standard. If the first SIM card works in the 3G standard, and the second SIM card works in the 3G standard, the information input module may first notify the resource scheduling module of information of the two SIM cards such as network standards, working frequencies, a service start time point and a service end time point, and whether uplink services require resources. The resource scheduling module determines, based on the service start time point and the service end time point of the two SIM cards, whether the services of the two SIM cards conflict in terms of time. When time does not conflict, the resource scheduling module may separately allocate corresponding resources based on the service features (for example, service time and service types) of the two SIM cards. When time conflicts, the resource scheduling module further determines whether baseband resources of the two SIM cards conflict and radio frequency resources of the two SIM cards conflict in the 3G standard. If the baseband resources of the two SIM cards conflict, it indicates that only one of the two SIM cards may use a baseband resource, and the other SIM card cannot use the baseband resource. Alternatively, if radio frequency resources of two SIM cards conflict, it indicates that only one of the two SIM cards can use a radio frequency resource, and the other SIM card cannot use the radio frequency resource temporarily. In other words, when a conflict occurs between baseband resources or between radio frequency resources, the terminal device may use the dual SIM dual standby mode. On the contrary, if there is no conflict between the baseband resources of the two SIM cards and between the radio frequency resources of the two SIM cards, the terminal device may use the dual receive dual SIM dual standby mode. Because only one set of baseband resources and one set of radio frequency resources are configured in the 3G standard, there is a conflict between the baseband resources of the two SIM cards and between the radio frequency resources of the two SIM cards, and the terminal device may use the dual SIM dual standby mode in the 3G standard.

For another example, if the first SIM card works in the LTE standard, and the second SIM card works in the LTE standard, the information input module may first notify the resource scheduling module of information of the two SIM cards such as network standards, working frequencies, and a service start time point and a service end time point. The resource scheduling module determines, based on the service start time point and the service end time point of the two SIM cards, whether the services of the two SIM cards conflict in terms of time. When time conflicts, the resource scheduling module further determines whether baseband resources of the two SIM cards conflict and radio frequency resources of the two SIM cards conflict in the LTE standard. Because two sets of baseband resources and two sets of radio frequency resources are configured in the LTE standard, there is a conflict between the baseband resources of the two SIM cards and between the radio frequency resources of the two SIM cards, and the terminal device may use the dual receive dual SIM dual standby mode in the LTE standard.

It should be noted that, for the foregoing description of selecting, based on the priorities of the services of both the cards according to the predefined criterion, a service of one card to perform resource allocation, refer to the prior art. Vendors provide different definitions of priorities of different services. Therefore, different criterions may be defined. This is not limited in this embodiment of this application.

It should be understood that the steps in FIG. 4 are merely shown for ease of understanding, and not all steps need to be performed. In addition, sequence numbers of the steps should not be limited to an execution sequence. For example, step 304 and step 306 may be simultaneously performed, or step 306 may be performed before 304. A sequence of performing the steps may be determined based on functions and internal logic of the steps.

It should be further understood that the foregoing specific process that is of determining the resource scheduling mode by the terminal device and that is described in detail with reference to FIG. 4 is merely an example, and should not constitute any limitation on this application. The terminal device may alternatively determine, in another manner, the resource scheduling mode that may be currently used by the terminal device.

Based on the foregoing description provided with reference to FIG. 4, it may be found that the resource scheduling module may determine the resource scheduling mode according to the predefined policy. For example, for the dual-SIM terminal, the resource scheduling module may determine the resource scheduling mode of the terminal device according to the following policies.

Policy 1: At a same time, only one SIM card can obtain authorization for uplink sending. In other words, the dual SIM dual standby mode is selected. This is determined by the baseband resource and the radio frequency resource.

It should be noted that the dual SIM dual standby mode may be an uplink resource scheduling mode. To be specific, at a same time, only one SIM card can use the baseband resource and the radio frequency resource for sending.

Policy 2: When the services of both the cards include only downlink receiving, the dual SIM dual standby mode or the dual receive dual SIM dual standby mode may be further selected based on a configured baseband resource and a configured radio frequency resource. When resources are sufficient, either the dual receive dual SIM dual standby mode or the dual SIM dual standby mode may be selected. When resources are insufficient, the dual SIM dual standby mode may be selected.

It should be noted that the dual SIM dual standby mode or the dual receive dual SIM dual standby mode may be a downlink resource scheduling mode. The services of both the cards include only downlink receiving in a possible case in which both the two cards are in an idle mode. Therefore, in the dual receive dual SIM dual standby mode, the two SIM cards may concurrently receive paging messages, system messages, measurement tasks, and the like. In the dual SIM dual standby mode, the two SIM cards may exclusively occupy a resource in a time division multiplexing manner, to receive paging messages, system messages, measurement tasks, and the like.

Policy 3: When one SIM card has both an uplink service and a downlink service, and the other SIM card has only a downlink service, the dual receive dual SIM dual standby mode and the dual SIM dual standby mode may be selected.

It should be noted that the dual SIM dual standby mode or the dual receive dual SIM dual standby mode may be a downlink resource scheduling mode. A SIM card that has both the uplink service and the downlink service may be in a connected mode, and the other SIM card that has only the downlink service may be in an idle mode. Therefore, in the dual receive dual SIM dual standby mode, the two SIM cards may concurrently receive paging messages, system messages, measurement tasks, and the like. In the dual SIM dual standby mode, the two SIM cards may exclusively occupy a resource in a time division multiplexing manner, to receive paging messages, system messages, measurement tasks, and the like.

It can be learned that a resource scheduling mode used by the terminal device is related to a configured baseband resource and a configured radio frequency resource, and the baseband resource is also related to a network standard. Therefore, the terminal device may determine a resource scheduling mode of the terminal device based on a baseband resource and a radio frequency resource that are configured in a current network standard.

The following describes the policy 2 in detail with reference to resource allocation cases in different network standards.

In the prior art, a dual-SIM mobile phone including two SIM cards has been implemented for existing standards. With evolution of network standards, two SIM cards of a dual-SIM mobile phone work in an LTE standard, in most cases. However, currently, only one radio frequency processing module and one baseband processing module are allocated to the dual-SIM mobile phone in the LTE standard. To be specific, when the two SIM cards work in the LTE standard, because of limited resources, the mobile phone can use only a dual SIM dual standby resource scheduling mode. Consequently, user experience is not optimal.

In consideration that a user works in a dual LTE standard for more time, to maximize user experience, two radio frequency processing modules and two baseband processing modules are configured in the LTE standard in this embodiment of this application. In another standard, for example, in standards such as TD-SCDMA, CDMA2000, WCDMA, and GSM, in consideration of an existing network coverage, a use habit of the user, and costs, there is a possibility that only one radio frequency processing module and one baseband processing module is configured. In addition, in consideration of costs and radio frequency mutual interference, two radio frequency processing modules for receiving may be configured. Both radio frequency front-ends of the two radio frequency processing modules support the LTE standard, but only one radio frequency front-end supports the 2G standard and the 3G standard. In other words, when the two SIM cards are in the 2G standard or in the 3G standard, only one radio frequency processing module may be used.

Therefore, in the LTE standard, the two SIM cards may respectively use one radio frequency processing module for receiving and one baseband processing module for receiving to concurrently receive downlink signals. Based on the foregoing configuration, resource scheduling modes that may be used by the dual-SIM terminal in different network standards may be shown in the following table.

| Wireless communications standard of a card 1 | Wireless communications standard of a card 2 | Resource scheduling modes that may be used |
| --- | --- | --- |
| GSM/WCDMA/TD-SCDMA/CDMA2000 | GSM/WCDMA/TD-SCDMA/CDMA2000 | Dual SIM dual standby mode |
| GSM/WCDMA/TD-SCDMA/CDMA2000 | LTE | Dual receive dual SIM dual standby mode or dual SIM dual standby mode |
| LTE | GSM/WCDMA/TD-SCDMA/CDMA2000 | Dual receive dual SIM dual standby mode or dual SIM dual standby mode |
| LTE | LTE | Dual receive dual SIM dual standby mode or dual SIM dual standby mode |

Based on the foregoing configuration, the terminal device may maximize user experience in a dual-SIM LTE standard. In addition, with reference to the method provided in this embodiment of this application, the terminal device may properly allocate resources in the dual-SIM LTE standard, and flexibly switch between different resource scheduling modes.

It should be understood that the foregoing table lists, with reference to the resources configured in this embodiment, resource scheduling modes that may be used by the two SIM cards in different network standards. However, this shall not constitute any limitation on this application. With evolution of a communications protocol, a possibility that two sets of radio frequency resources and two sets of baseband resources are configured for a future terminal device for a 5G standard is not excluded in this application, so that the dual receive dual SIM dual standby mode can be implemented in the 5G standard.

Figure 5:
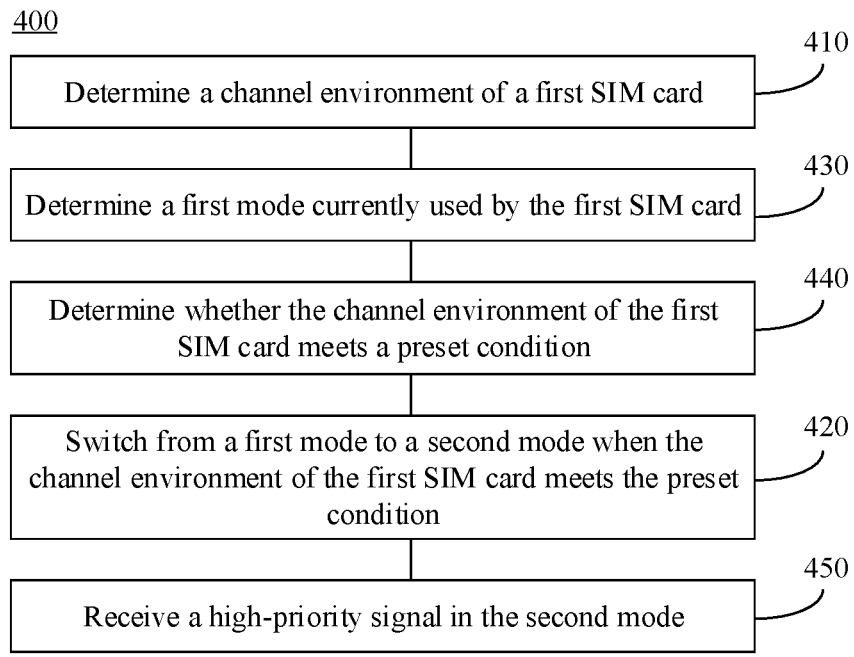
FIG. 5 is a schematic flowchart of a signal receiving method according to an embodiment of this application.

The following describes in detail a signal receiving method provided in this application with reference to FIG. 5. It should be understood that the method is not only applicable to a dual-SIM terminal device, but also applicable to a terminal device that may be provided with more SIM cards. A quantity of SIM cards is not limited in this application. The terminal device may be provided with a plurality of receive antennas. For example, the terminal device is a multi-antenna terminal device. Without loss of generality, the following describes in detail the signal receiving method provided in this embodiment of this application by using a first SIM card in a plurality of SIM cards as an example.

FIG. 5 is a schematic flowchart of a signal receiving method 400 according to an embodiment of this application. As shown in the figure, the method 400 may include step 410 to step 450. The steps in FIG. 5 are described in detail below.

Step 410: Determine a channel environment of a first SIM card.

The first SIM card may be a SIM card that is in a plurality of SIM cards configured for a terminal device and that is configured to receive a high-priority signal. By way of example rather than a predefinition, the high-priority signal includes a paging message, a system message, or downlink signaling in a signaling interaction procedure.

Specifically, for example, step 410 may be performed by the information input module described above with reference to FIG. 3. The information input module may predetermine a first SIM card that needs to receive a high-priority signal in a future time period, and then further determine a channel environment of the first SIM card. For example, the information input module may determine a signal-to-noise ratio (SNR) or a signal to interference plus noise ratio (SINR) of a signal received by the first SIM card, a received energy or a received power of the signal, or the like.

It should be noted that the first SIM card may be any SIM card in the plurality of SIM cards configured for the terminal device, or in other words, the plurality of SIM cards configured for the terminal device each may receive a high-priority signal in different time periods. The SIM card configured to receive the high-priority signal is not particularly limited in this application.

In this embodiment of this application, for ease of description, a receiving time period of the high-priority signal may be denoted as a first time period. For example, in different network standards, an access network device may periodically send the paging message and the system message, and the terminal device may predetermine a start time point and an end time point for receiving the paging message and the system message, namely, the first time period. For another example, when the terminal device needs to perform a procedure such as establish a call, establish a data connection, or perform a cell handover, the terminal device may receive higher layer signaling in advance. The higher layer signaling may be used to instruct the terminal device to enter a high-priority signaling interaction procedure in a future time period. For example, the higher layer signaling may notify a start time and an end time for entering the high-priority signaling interaction procedure, namely, the first time period.

Optionally, the method 400 further includes: determining the first time period for receiving the high-priority signal.

The following separately describes specific methods for determining the first time period with reference to different signals.

The paging message may be a paging message sent to the terminal device by using the access network device when a core network (CN) needs to establish a connection to the terminal device. Alternatively, the paging message may be a paging message actively sent by an access network when the system message changes. In this embodiment of this application, if the SIM card does not receive the paging message, the SIM card may miss receiving a call, a short message, or the like. When the paging message carries a system message change indication, the SIM card may miss receiving a changed system message, causing an event in which a network is disconnected.

In a possible implementation, the terminal device may determine the receiving time period of the paging message based on a parameter carried in the system message. Specifically, after accessing a cell, the terminal device may receive a system message broadcast and sent by the access network device. The system message carries common information used to determine the receiving time period of the paging message. For example, the common information may be a default discontinuous reception (DRX) period allocated by the cell. The terminal device may calculate the receiving time period of the paging message based on an international mobile subscriber identity (IMSI) of the terminal device and the common information carried in the system message.

The system message may be a system message received by the terminal device when the terminal device newly accesses a cell or the broadcast message changes, and may be used by the terminal device to perform cell access, cell synchronization, or the like. The system information may include a master system information block (MIB) and a secondary system information block. The access network device may send the system message in a predefined timeslot. In this embodiment of this application, if the SIM card does not receive the system message, a network may be disconnected.

In a possible implementation, the receiving time period of the system message may be defined by using a communications protocol. The terminal device may receive the system message in a timeslot defined in a protocol.

The signaling interaction procedure may be a signaling interaction procedure in which a SIM card in the terminal device is switched from an idle mode to a connected mode, or may be a signaling interaction procedure in which the terminal device is switched from a source cell to a target cell. A specific signaling interaction procedure is not limited in this application. Because resource allocation used for uplink sending is not used in this application, a resource used for downlink receiving is mainly allocated to downlink signaling in the signaling interaction procedure in this application.

In a possible implementation, the first time period may be a time period of the signaling interaction procedure, and the terminal device may determine the time period of the signaling interaction procedure based on the received higher layer signaling. For example, when the signaling interaction procedure is a cell handover procedure, the higher layer signaling may be a handover indication from layer 3. When the signaling interaction procedure is a procedure of switching from an idle mode to a connected mode, in an LTE protocol, the higher layer signaling may be a service request from a NAS, and a corresponding call is a packet switched (PS) domain call, for example, voice over LTE (VoLTE); alternatively, the higher layer signaling may be an extended service request from a NAS, and a corresponding call may be a circuit switched (CS) domain call.

Therefore, the information input module may predetermine a time period for receiving a high-priority signal by each SIM card. Herein, without loss of generality, the first SIM card is used as an example to describe this embodiment of this application. Correspondingly, a time period for receiving the high-priority signal by the first SIM card may be denoted as the first time period.

It should be understood that, in different network standards, the terminal device may determine, in different manners, for example, based on different signaling, the first time period for receiving the high-priority signal by the first SIM card. In addition, when the terminal device is provided with a plurality of SIM cards, a possibility that time periods in which two or more SIM cards receive a high-priority signal overlaps is not excluded in this application.

It should be further understood that the foregoing listed specific content of the high-priority signal is merely an example, and shall not constitute any limitation on this application. With evolution of the communications protocol, a possibility of newly adding a message used to implement a same or similar function to a future protocol is not excluded in this application.

Step 420: Switch from a first mode to a second mode when the channel environment of the first SIM card meets a preset condition.

Specifically, for example, step 420 may be performed by the resource scheduling module described above with reference to FIG. 3. After determining the first time period for receiving the high-priority signal by the first SIM card, the resource scheduling module may determine, with reference to the channel environment of the first SIM card, whether the current first mode needs to be switched to the second mode or whether the first mode can be switched to the second mode. When it is determined, based on the channel environment, that the first mode needs to be switched to the second mode or the first mode can be switched to the second mode, the first mode is switched to the second mode.

The first mode and the second mode may be two different resource scheduling modes. A quantity of receive antennas allocated to one SIM card in the first mode may be different from a quantity of receive antennas allocated to one SIM card in the second mode. For example, the quantity of receive antennas allocated to one SIM card in the first mode is greater than the quantity of receive antennas allocated to one SIM card in the second mode. By way of example rather than a limitation, the first mode is a dual SIM dual standby mode, and the second mode is a dual receive dual SIM dual standby mode, or the quantity of receive antennas allocated to one SIM card in the first mode is less than the quantity of receive antennas allocated to one SIM card in the second mode. By way of example rather than a limitation, the first mode is a dual receive dual SIM dual standby mode, and the second mode is a dual SIM dual standby mode.

The receive antenna may be understood as a part of a radio frequency processing module. In addition to the receive antenna, the radio frequency processing module may include, for example, an amplifier, a transceiver, a coupler, a low noise amplifier, and a duplexer. In a possible design, the two receive antennas corresponding to two SIM cards may separately correspond to different amplifiers, transceivers, couplers, low noise amplifiers, duplexers, and the like. In this design, two radio frequency processing modules corresponding to the two SIM cards may be considered as independent of each other, and a component in each radio frequency processing module is only configured to receive and process a signal of a corresponding SIM card. In another possible design, the plurality of receive antennas may share the foregoing components. To be specific, the two SIM cards may use different receive antennas, but may use a same amplifier, transceiver, coupler, low noise amplifier, duplexer, and the like. In this design, some components in the two radio frequency processing modules respectively corresponding to the two SIM cards may be multiplexed.

In this embodiment of this application, the quantity of receive antennas configured for the first SIM card in the first mode may be greater than the quantity of receive antennas configured for the first SIM card in the second mode, or the quantity of receive antennas configured for the first SIM card in the first mode may be less than the quantity of receive antennas configured for the second SIM card in the second mode.

A dual-SIM mobile phone is used as an example. It assumed that the mobile phone is provided with two receive antennas. One receive antenna may be allocated to the first SIM card in the first mode, and two receive antennas may be allocated to the first SIM card in the second mode. Alternatively, two receive antennas may be allocated to the first SIM card in the first mode, and one receive antenna may be allocated to the first SIM card in the second mode.

Optionally, before step 420, the method 400 further includes: Step 430: Determine a first mode currently used by the terminal device.

As described above, after determining a resource allocated to each SIM card, the resource scheduling module may notify each protocol layer of a resource scheduling mode. Each protocol layer and the resource scheduling module may maintain the resource scheduling mode. The resource scheduling mode is the currently used first mode. The following separately describes step 420 in detail with reference to the two possible cases.

Case 1:

The quantity of receive antennas configured for the first SIM card in the first mode may be less than the quantity of receive antennas configured for the first SIM card in the second mode.

In this case, optionally, step 420 specifically includes:

switching from the first mode to the second mode when the channel environment of the first SIM card meets the preset condition.

Further, optionally, the method 400 further includes: when the channel environment of the first SIM card does not meet the first preset condition, remaining in the first mode, or not switching from the first mode to the second mode.

For ease of differentiation and description, preset conditions used in different cases are respectively denoted as a first preset condition and a second preset condition. The first preset condition may be applied to Case 1. To be specific, the quantity of receive antennas configured for the first SIM card in the first mode is less than the quantity of receive antennas configured for the first SIM card in the second mode. The second preset condition may be applied to Case 2. To be specific, the quantity of receive antennas configured for the first SIM card in the first mode is greater than the quantity of receive antennas configured for the first SIM card in the second mode.

Optionally, before step 420, the method further includes:

Step 440: Determine whether the channel environment of the first SIM card meets the first preset condition.

The first preset condition includes:

a signal-to-noise ratio SNR is less than or equal to a first preset threshold; and/or a received energy of a signal is less than or equal to a second preset threshold.

In an implementation, the resource scheduling module may use, as a parameter for determining the channel environment, the signal-to-noise ratio (SNR) of the signal received by the first SIM card. For example, when the signal-to-noise ratio is greater than or equal to a preset threshold, it may be considered that the channel environment is relatively good; or when the signal-to-noise ratio is less than a preset threshold, it is considered that the channel environment is relatively poor. For ease of differentiation and description, a threshold of the signal-to-noise ratio is denoted as the first preset threshold.

In another implementation, the resource scheduling module may use, as a parameter for determining the channel environment, the received energy of the signal received by the first SIM card. For example, when the received energy of the signal is greater than or equal to a preset threshold, it may be considered that the channel environment is relatively good; or when the received energy of the signal is less than a preset threshold, it is considered that the channel environment is relatively poor. For ease of differentiation and description, a threshold of the received energy of the signal is denoted as the second preset threshold.

It may be understood that the first preset threshold and the second preset threshold may be predefined. Specific values of the first preset threshold and the second preset threshold are not limited in this application.

In still another implementation, the resource scheduling module may determine the channel environment by combining the signal-to-noise ratio and the received energy of the signal received by the first SIM card. For example, when the signal-to-noise ratio of the signal is greater than or equal to the first preset threshold, and the received energy of the signal is greater than or equal to the second preset threshold, it is considered that the channel environment is relatively good; or when the signal-to-noise ratio of the signal is less than the first preset threshold, or the received energy of the signal is less than the second preset threshold, it is considered that the channel environment is relatively poor.

It should be understood that the foregoing listed preset condition of determining channel environment quality is merely an example, and shall not constitute any limitation on this application. A case in which channel quality is determined by using another parameter is not excluded in this application.

Further, because the resource scheduling module cannot know the channel environment of the first SIM card in the first time period in advance, a channel environment that is of the first SIM card and that exists before the first time period may be used as a basis for determining, in step 420, whether the first mode needs to be switched to the second mode.

When resources are sufficient, to avoid a problem that a call is missed, the resource scheduling module may allocate the resources to a plurality of SIM cards for use. For example, a plurality of receive antennas are allocated to a plurality of SIM cards for use, each SIM card may receive a downlink signal by using at least one receive antenna, and the plurality of SIM cards can share a baseband resource and a radio frequency resource, and concurrently receive downlink signals.

If the information input module notifies the resource scheduling module that the first SIM card needs to receive the high-priority signal in the first time period, signal receiving quality of the first SIM card needs to be preferably ensured when the resource scheduling module allocates a resource to each SIM card. If none of the foregoing high-priority signals is received, a relatively serious consequence may be caused. In this embodiment of this application, the resource scheduling module may further determine, with reference to the channel environment of the first SIM card, whether a current multi receive multi SIM multi standby mode needs to be switched to another mode in the first time period to receive the high-priority signal.

If the channel environment of the first SIM card is relatively poor, the resource scheduling module may increase the quantity of receive antennas allocated to the first SIM card, so that the first SIM card can receive the high-priority signal by using more receive antennas, to obtain a diversity gain, and ensure signal receiving quality of the high-priority signal.

To be specific, the quantity of receive antennas allocated to the first SIM card in the first mode is less than the quantity of receive antennas allocated to the first SIM card in the second mode.

By way of example rather than a limitation, the first mode may include a dual receive dual SIM dual standby mode, a multi receive multi SIM multi standby mode, and the like.

By way of example rather than a limitation, the second mode may include a dual SIM dual standby mode, a multi SIM multi standby mode, and the like.

As described above, in the dual receive dual SIM dual standby mode, the two SIM cards may share a baseband resource and a radio frequency resource, and concurrently receive downlink signals. Similarly, in the multi receive multi SIM multi standby mode, the two SIM cards may share a baseband resource and a radio frequency resource, and concurrently receive downlink signals. It should be noted that, in the multi receive multi SIM multi standby mode, it does not mean that all SIM cards configured for the terminal device can share a baseband resource and a radio frequency resource in a same time period, and concurrently receive downlink signals. When a plurality of SIM cards are configured for the terminal device, provided that two or more SIM cards can share a baseband resource and a radio frequency resource, and concurrently receive downlink signals, it may be considered that the terminal device supports the multi receive multi SIM multi standby mode.

Correspondingly, in the dual SIM dual standby mode, one of two SIM cards exclusively occupies the baseband resource and the radio frequency resource in any time period. Similarly, in the multi SIM multi standby mode, one of a plurality of SIM cards exclusively occupies the baseband resource and the radio frequency resource in any time period.

It can be learned from the foregoing example that a difference between the first mode and the second mode is not limited to only a difference in the quantity of receive antennas, and different baseband processing modules and/or radio frequency processing modules may also be configured for different SIM cards. This is not limited in this application. Provided that different quantities of receive antennas are allocated to the first SIM card in the two modes, this should fall within the protection scope of this application.

The dual-SIM mobile phone is used as an example. In the first mode, two SIM cards may separately receive downlink signals by using different radio frequency processing modules, or may receive downlink signals by using different receive antennas in a same radio frequency processing module. The two SIM cards may further receive downlink signals from different radio frequency processing modules by using different baseband processing modules, or may receive downlink signals from different radio frequency processing modules by using a same baseband processing module.

Further, if the two SIM cards are in a same network standard, the two SIM cards may use different radio frequency processing modules and different baseband processing modules, or may use different radio frequency processing modules and a same baseband processing module. Regardless of whether the baseband processing modules are the same or different, the baseband processing modules are used for signal processing in the same network standard. If the two SIM cards are in different network standards, the two SIM cards may use different radio frequency processing modules and different baseband processing modules. Different baseband processing modules may be used for signal processing in different network standards.

In the second mode, all receive antennas originally allocated to the two SIM cards may be allocated to the first SIM card, and the first SIM card exclusively occupies all the receive antennas.

However, it should be understood that, in the second mode, allocating all the receive antennas to the first SIM card for use is merely a possible implementation. When there are a relatively large quantity of receive antennas, for example, eight antennas or sixteen antennas, the resource scheduling module may also allocate some antennas, for example, two antennas or four antennas, in receive antennas used by another SIM card (for example, denoted as the second SIM card) to the first SIM card for use. In this case, the second mode may still be a dual receive dual SIM dual standby mode, but quantities of receive antennas allocated to different SIM cards change.

Optionally, the method 400 further includes: Step 450: Receive the high-priority signal.

Specifically, step 450 may be implemented by using a radio frequency processing module allocated by the resource scheduling module to a SIM card. For example, the high-priority signal is received by using the receive antenna, and processing is performed on the signal, for example, frequency modulation processing, signal amplification, or filtering. A signal processed by the radio frequency processing module may be sent to the baseband processing module, and is processed by the baseband processing module. Then, the high-priority signal is obtained.

Based on the foregoing determining, the resource scheduling module may determine whether to switch from the first mode to the second mode. When the terminal device switches to the second mode, the terminal device may receive the high-priority signal in the second mode; or when the terminal device does not switch to the second mode, the terminal device may receive the high-priority signal in the first mode. Based on the foregoing technical solution, the resource scheduling module may receive the high-priority signal by allocating more receive antennas to the first SIM card, to obtain a diversity gain, improve signal receiving quality, avoid occurrence of an event in which a call is missed and a network is disconnected, and improve user experience.

Case 2:

The quantity of receive antennas configured for the first SIM card in the first mode may be greater than the quantity of receive antennas configured for the first SIM card in the second mode.

In this case, optionally, step 420 specifically includes:

switching from the first mode to the second mode when the channel environment of the first SIM card meets the second preset condition.

Further, optionally, the method 400 further includes:

when the channel environment of the first SIM card does not meet the second preset condition, remaining in the first mode, or not switching from the first mode to the second mode.

As described above, the second preset condition may be applied to Case 2.

Optionally, before step 420, the method further includes:

Step 440: Determine whether the channel environment of the first SIM card meets the second preset condition.

The second preset condition includes:

the signal-to-noise ratio is greater than a third preset threshold; and/or the received energy of the signal is greater than a fourth preset threshold.

A specific process in which the resource scheduling module determines, based on a relationship between the channel environment and the second preset condition, whether to switch from the first mode to the second mode is similar to a specific process in which the resource scheduling module determines, based on a relationship between the channel environment and the first preset condition, whether to switch from the first mode to the second mode. For brevity, details are not described herein again.

It may be understood that the third preset threshold and the fourth preset threshold that are listed herein may be predefined. Specific values of the third preset threshold and the fourth preset threshold are not limited in this application. The first preset threshold and the third preset threshold may be the same or different, and the second preset threshold and the fourth preset threshold may be the same or different. This is not limited in this application.

In some cases, for example, when some SIM cards in the plurality of SIM cards configured for the terminal device do not receive a task, the resource scheduling module may allocate all receive antennas to a first SIM card having the receiving task, or allocate all baseband resources and radio frequency resources to the first SIM card for use, to achieve diversity transmission, and improve signal receiving quality.

If the information input module determines that the first SIM card needs to receive the high-priority signal in the first time period, and another SIM card also has the receiving task, the information input module may notify the resource scheduling module, so that the resource scheduling module allocates a resource to each SIM card. When allocating the resource to each SIM card, the resource scheduling module needs to preferably ensure the signal received quality of the first SIM card. As described above, the resource scheduling module may further determine, with reference to the channel environment of the first SIM card, whether to remain in the first mode in the first time period to receive the high-priority signal, or whether to switch to the second mode to receive the high-priority signal.

If the channel environment of the first SIM card is relatively poor, the resource scheduling module may allocate a plurality of receive antennas to the first SIM card, and the terminal device may remain in the first mode without switching. If the channel environment of the first SIM card is relatively good, the resource scheduling module may reduce the quantity of receive antennas allocated to the first SIM card, and the terminal device switches to the second mode to receive the high-priority signal.

To be specific, the quantity of receive antennas allocated to the first SIM card in the first mode is greater than the quantity of receive antennas allocated to the first SIM card in the second mode.

By way of example rather than a limitation, the first mode may include a dual SIM dual standby mode, a multi SIM multi standby mode, and the like.

By way of example rather than a limitation, the second mode may include a dual receive dual SIM dual standby mode, a multi receive multi SIM multi standby mode, and the like.

The foregoing describes in detail the dual SIM dual standby mode, the multi SIM multi standby mode, the dual receive dual SIM dual standby mode, and the multi receive multi SIM multi standby mode. For brevity, details are not described herein again.

Optionally, the method 400 further includes: Step 450: Receive the high-priority signal.

Based on the foregoing determining, the resource scheduling module may determine whether to switch from the first mode to the second mode. When the terminal device switches to the second mode, the terminal device may receive the high-priority signal in the second mode; or when the terminal device does not switch to the second mode, the terminal device may receive the high-priority signal in the first mode.

Based on the foregoing technical solution, when the channel environment of the first SIM card is relatively good, the resource scheduling module may allocate some receive antennas to another SIM card that has a receiving task for use, to prevent a multi-SIM terminal device from missing a call, and improve user experience.

Optionally, before step 420, the method further includes the following step.

Step 440: Determine whether the channel environment of the first SIM card meets the second preset condition.

The second preset condition includes:

the signal-to-noise ratio SNR is less than or equal to the first preset threshold; and/or the received energy of the signal is less than or equal to the second preset threshold.

Optionally, step 440 specifically includes: determining whether the channel environment of the first SIM card in a second time period meets the preset condition, where the second time period is before the first time period, and a time interval between the second time period and the first time period is less than the third preset threshold.

For example, when a time interval between a start moment of the first time period and an end moment of the second time period is less than the third preset threshold, a channel environment in the second time period may be used as a basis for determining whether to switch from the first mode to the second mode in step 420.

In a possible design, the third preset threshold may be a paging message sending period, for example, 1.28 seconds. In other words, a signal-to-noise ratio and/or received energy of a signal that are/is obtained when a paging message is received last time may be used as a parameter for determining a channel environment in which the paging message is received next time.

It may be understood that the third preset threshold may be predefined. A specific value of the third preset threshold is not limited in this application.

Based on the foregoing technical solution, when the first SIM card needs to receive the high-priority signal, the terminal device may perform pre-determining with reference to a current resource scheduling mode and the channel environment, to determine whether the resource scheduling mode needs to be changed to receive the high-priority signal. When signal quality is good, the terminal device may reduce a quantity of resources allocated to the first SIM card, and allocate the resources to another SIM card for use. When signal quality is poor, the terminal device increases a quantity of resources allocated to the first SIM card, to ensure that the high-priority signal is successful received. Therefore, an event such as missing a call or being disconnected from a network can be avoided as much as possible, and user experience is improved. In addition, switching may be flexibly performed between different resource scheduling modes based on the channel environment, to reach a compromise between performance and costs.

Optionally, the terminal device is a dual-SIM terminal, the first mode is the dual receive dual SIM dual standby mode, and the second mode is the dual SIM dual standby mode.

To avoid occurrence of missing a call by the dual-SIM terminal, usually, the dual-SIM terminal may be set to the dual receive dual SIM dual standby mode. In other words, the two SIM cards may share the radio frequency resource and the baseband resource. After a first time period for receiving the high-priority signal by a first SIM card in two SIM cards is determined, to ensure that the first SIM card successfully receives the high-priority signal in the first time period, whether the terminal device needs to switch to the dual SIM dual standby mode may be determined with reference to a channel environment of the first SIM card. As described above, in the dual SIM dual standby mode, the first SIM card may exclusively occupy the radio frequency resource and the baseband resource. Therefore, a diversity gain can be obtained, and signal receiving quality can be improved.

In this embodiment of this application, the two SIM cards in the dual-SIM terminal may work in a same network standard, or may work in different network standards.

If the two SIM cards can work in a same network standard, the terminal device may preconfigure two or more sets of independent radio frequency resources and two or more sets of independent baseband resources for the two SIM cards. In consideration of costs, the terminal device may configure two sets of independent radio frequency resources and two sets of independent baseband resources for the two SIM cards, or may configure two sets of independent radio frequency resources and one set of baseband resource for the two SIM cards.

Specifically, the terminal device may configure one radio frequency processing module and one baseband processing module for the first SIM card in the two cards, and configure one radio frequency processing module and one baseband processing module for a second SIM card in the two cards. Each radio frequency processing module includes one receive antenna. Alternatively, the terminal device may preconfigure two sets of independent radio frequency resources for the two SIM cards. Specifically, the terminal device may configure one radio frequency processing module for the first SIM card in the two cards, and configure one radio frequency processing module for the second SIM card in the two cards. The first SIM card and the second SIM card may share a same baseband processing module.

In the dual SIM dual standby mode, the first SIM card or the second SIM card in the two SIM cards may exclusively occupy the radio frequency resource and the baseband resource. To be specific, the first SIM card or the second SIM card may exclusively occupy two radio frequency processing modules and two baseband processing modules, or exclusively occupy two radio frequency processing modules and one baseband processing module. All receive antennas included in the two radio frequency processing modules are used for downlink receiving performed by the first SIM card or the second SIM card.

In the dual receive dual SIM dual standby mode, the first SIM card and the second SIM card in the two cards may share the radio frequency resource and the baseband resource. To be specific, the first SIM card uses one radio frequency processing module and one baseband processing module, and the second SIM card uses another radio frequency processing module and another baseband processing module. Alternatively, the first SIM card uses one radio frequency processing module, the second SIM card uses another radio frequency processing module, and the first SIM card and the second SIM card jointly use one baseband processing module.

Optionally, the network standard may be 5G, LTE, 3G, 2.5G, or 2G.

Because there are limited resources in the dual-SIM terminal, when all resources are allocated to the first SIM card for use, the second SIM card cannot perform downlink receiving. Therefore, if the first mode is the dual receive dual SIM dual standby mode, and the second mode is the dual SIM dual standby mode, optionally, the method 400 further includes: determining that the second SIM card does not receive the high-priority signal in the first time period.

As described above, the terminal device may know in advance whether each SIM card sends an uplink service or receives a downlink service in a future time period, or may predetermine a time in which each SIM card receives the high-priority signal. Therefore, the terminal device may determine whether the second SIM card receives the high-priority signal in the first time period. If the second SIM card has no task of receiving the paging message, the system message, or the downlink signaling in the signaling interaction procedure in the first time period, it may be considered that the second SIM card does not receive the high-priority signal in the first time period, for example, when the second SIM card browses a web page or downloads data. The radio frequency resource and the baseband resource that are originally allocated to the second SIM card for use may be allocated to the first SIM card for use. In other words, the terminal device is switched to the dual SIM dual standby mode.

Based on the foregoing technical solution, the dual-SIM terminal may dynamically allocate resources to two SIM cards based on service priorities of the two SIM cards with reference to the channel environment, so that the dual-SIM terminal can flexibly switch between different resource scheduling modes based on factors such as the service priorities and the channel environment, to avoid, as much as possible, occurrence of an event such as missing a call or being disconnected from a network. Therefore, user experience is improved. It should be understood that FIG. 5 shows only some steps in the foregoing method 400 for ease of understanding, but this should not constitute any limitation on this application. Sequence numbers of the foregoing steps do not indicate an execution sequence. The execution sequence of the steps should be determined based on functions and internal logic of the steps, and should not be construed as any limitation on the implementation process of this embodiment of this application.

It may be understood that the foregoing technical solution is equivalent to further determining performed before step 309 in the procedure shown in FIG. 4. After determining an available resource scheduling mode based on a network standard, an operating frequency band, a configuration of a baseband resource, and a configuration of a radio frequency resource, the resource scheduling module may further consider a channel environment of each SIM card, and determine whether a resource scheduling mode determined before step 309 needs to be adjusted. For example, if the resource scheduling module determines, based on the baseband resource and the radio frequency resource that are configured for the terminal device, that the dual SIM dual standby mode or the dual receive dual SIM dual standby mode may be used in a network standard, to avoid a problem that the dual-SIM terminal misses a call, the resource scheduling module may preferably use the dual receive dual SIM dual standby mode. It is assumed that the first SIM card needs to receive the high-priority signal in the first time period. With reference to the channel environment, when the channel environment quality of the first SIM card is good, the resource scheduling mode may further maintain a decision about the dual receive dual SIM dual standby mode; or when the channel environment quality of the first SIM card is poor, the resource scheduling mode may adjust the dual receive dual SIM dual standby mode to the dual SIM dual standby mode, and output this resource scheduling mode to each protocol layer.

Optionally, before step 410, the method further includes: determining a current resource scheduling mode of the terminal device based on a baseband resource and a radio frequency resource that are configured in a current network standard.

Specifically, the current resource scheduling mode of the terminal device is the first mode described above. This step may be performed by the foregoing resource scheduling module. A specific process of performing this step is described in detail above with reference to FIG. 4. For brevity, details are not described herein again.

In a specific embodiment, it is assumed that the terminal device is a dual-SIM mobile phone, both SIM cards work in an LTE standard, and the current resource scheduling mode may be the dual receive dual SIM dual standby mode. It is assumed that the two SIM cards are in an idle mode, and can receive the paging message, the system message, or the measurement task, or enter the signaling interaction procedure. The first SIM card receives the service request from the NAS, and prepares to establish a call. The information input module may send a notification to the resource scheduling module after the first SIM card receives the service request from the NAS, to notify the resource scheduling module that the first SIM card needs to establish a call in a future time period. After receiving the notification from the information input module, the resource scheduling module may further determine, with reference to the channel environment of the first SIM card, whether the terminal device needs to switch from the dual receive dual SIM dual standby mode to the dual SIM dual standby mode. For example, when the signal-to-noise ratio of the signal received by the first SIM card is greater than or equal to the first preset threshold, it indicates that the channel environment is relatively good. The resource scheduling module may determine that the terminal device may remain in the dual receive dual SIM dual standby mode, the first SIM card may be switched to the connected mode, and establish a call connection, and the second SIM card may remain in the idle mode. Because the second SIM card still has a resource that can be used, the second SIM card may still receive a downlink signal, for example, may receive the paging message, the system message, or the measurement task. When the signal-to-noise ratio of the signal received by the first SIM card is less than the first preset threshold, it indicates that the channel environment is relatively poor, and the resource scheduling module may allocate the radio frequency resource and the baseband resource of the second SIM card to the first SIM card. In other words, the terminal device may switch to the dual SIM dual standby mode, and the first SIM card exclusively occupies the resources, may be switched to the connected mode, and establish a call connection. The second SIM card may remain in the idle mode, but cannot receive or send a signal because there is no resource that can be used.

For another example, the two SIM cards work in the LTE standard. The first SIM card may be in the idle mode, and the second SIM card may be in the connected mode, for example, is downloading data. The current resource scheduling mode may be the dual receive dual SIM dual standby mode. If the first SIM card receives the service request from the NAS, the first SIM card prepares to establish a call connection. Therefore, the information input module may send a notification to the resource scheduling module after the first SIM card receives the service request from the NAS, to notify the resource scheduling module that the first SIM card needs to establish a call connection in a future time period (for example, the first time period). After receiving the notification from the information input module, the resource scheduling module may interrupt a downloading task of the second SIM card. For example, the second SIM card may return to the idle mode. The resource scheduling module may further determine, based on the channel environment of the first SIM card, whether the terminal device needs to switch to the dual SIM dual standby mode. For example, when the received energy of the signal received by the first SIM card is greater than or equal to the second preset threshold, it indicates that the channel environment is relatively good. The resource scheduling module may determine that the terminal device may remain in the dual receive dual SIM dual standby mode, the first SIM card may be switched to the connected mode, and establish a call connection, and the second SIM card may remain in the idle mode. Because the second SIM card still has a resource that can be used, the second SIM card may still receive a downlink signal in the idle mode, for example, may receive the paging message, the system message, or the measurement task. When the received energy of the signal received by the first SIM card is less than the second preset threshold, it indicates that the channel environment is relatively poor, and the resource scheduling module may allocate the radio frequency resource and the baseband resource of the second SIM card to the first SIM card. In other words, the resource scheduling mode may be switched to the dual SIM dual standby mode. The first SIM card exclusively occupies a resource, establishes a call, and switches to the connected mode. The second SIM card may return to the idle mode. Because there is no resource that can be used, the second SIM card cannot receive or send a signal.

For another example, the two SIM cards work in the LTE standard. The first SIM card may be in the idle mode, and the second SIM card may be in the connected mode, for example, is downloading data. The current resource scheduling mode may be the dual receive dual SIM dual standby mode. If the first SIM card determines to receive the paging message in a future time period (for example, the first time period), the information input module may send a notification to the resource scheduling module, to notify the resource scheduling module that the first SIM card needs to receive the paging message in the first time period. The resource scheduling module may determine, based on the channel environment of the first SIM card, whether the terminal device needs to switch to the dual SIM dual standby mode. For example, when the received energy of the signal received by the first SIM card is greater than or equal to the second preset threshold, it indicates that the channel environment is relatively good. The resource scheduling module may determine that the terminal device may remain in the dual receive dual SIM dual standby mode. The first SIM card may still remain in the idle mode, and receive the paging message by using the baseband resource and the radio frequency resource that are allocated by the resource scheduling module. The second SIM card may return to the idle mode, or may be temporarily suspended, to be specific, remains in the connected mode but does not perform sending or receiving. When the received energy of the signal received by the first SIM card is less than the second preset threshold, it indicates that the channel environment is relatively poor. The resource scheduling module may determine that the terminal device can switch to the dual SIM dual standby mode. The first SIM card may still remain in the idle mode, and exclusively occupy a resource to receive the paging message. The second SIM card may return to the idle mode or may be temporarily suspended. Because there is no resource that can be used, the second SIM card cannot receive or send a signal. It should be understood that the foregoing describes the method provided in this embodiment of this application with reference to several specific examples for ease of understanding. However, these examples are merely illustrated for ease of understanding, and should not constitute any limitation on this application. In addition, the foregoing listed specific scenario in which the SIM card is in the idle mode or the connected mode is merely described for ease of understanding, and shall not constitute any limitation on this application.

The methods provided in the embodiments of this application are described above in detail with reference to FIG. 3 to FIG. 5. The terminal devices provided in the embodiments of this application are described below in detail with reference to FIG. 6 and FIG. 7.

Figure 6:
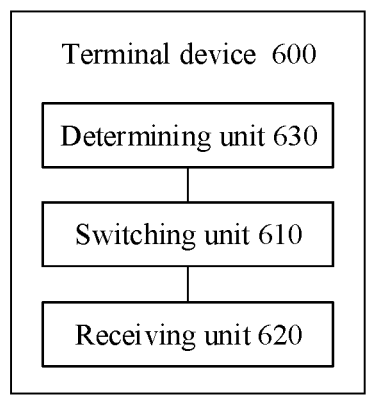
FIG. 6 is a schematic block diagram of a terminal device according to an embodiment of this application.

FIG. 6 is a schematic block diagram of a terminal device 600 according to an embodiment of this application. As shown in the figure, the terminal device 600 may include a determining unit 610, a switching unit 620, and a receiving unit 630.

Specifically, the switching unit 610 may be configured to switch from a first mode to a second mode when a channel environment of a first SIM card meets a preset condition. A quantity of receive antennas configured for the first SIM card in the first mode is different from a quantity of receive antennas configured for the first SIM card in the second mode.

Optionally, the preset condition includes:

a signal-to-noise ratio SNR is less than or equal to a first preset threshold; and/or a received energy of a signal is less than or equal to a second preset threshold.

Optionally, the terminal device 600 further includes the receiving unit 620, configured to receive a high-priority signal in the second mode.

Optionally, the terminal device 600 further includes the determining unit 630, configured to determine a first time period for receiving the high-priority signal.

Optionally, the quantity of receive antennas configured for the first SIM card in the first mode may be less than the quantity of receive antennas configured for the first SIM card in the second mode.

Optionally, the terminal device is a dual-SIM terminal, the first mode is the dual receive dual SIM dual standby mode, and the second mode is the dual SIM dual standby mode.

Optionally, two SIM cards in the terminal device work in a same network standard, the terminal device includes two radio frequency processing modules configured to receive signals in the network standard, and each radio frequency processing module includes one or more receive antennas.

Optionally, the network standard is an LTE standard.

Specifically, the terminal device 600 may correspond to the terminal device in the signal receiving method 400 according to the embodiments of this application. The terminal device 600 may include units configured to perform the method performed by the terminal device in the signal receiving method 400 in FIG. 5. The determining unit 630 may be configured to perform step 410, step 430, and step 440 in the embodiment shown in FIG. 5. The switching unit 610 may be configured to perform step 420 in the embodiment shown in FIG. 5. The receiving unit 630 may be configured to perform step 450 in the embodiment shown in FIG. 5. In addition, the units in the terminal device 600 and the foregoing other operations and/or functions are respectively intended to implement a corresponding procedure of the signal receiving method 400 in FIG. 5. For brevity, details are not described herein.

In a possible design, the determining unit 630 and the switching unit 610 may correspond to the processor 130 in the mobile phone shown in FIG. 1, and the receiving unit 620 may correspond to the radio frequency circuit 110 in the mobile phone shown in FIG. 1.

Figure 7:
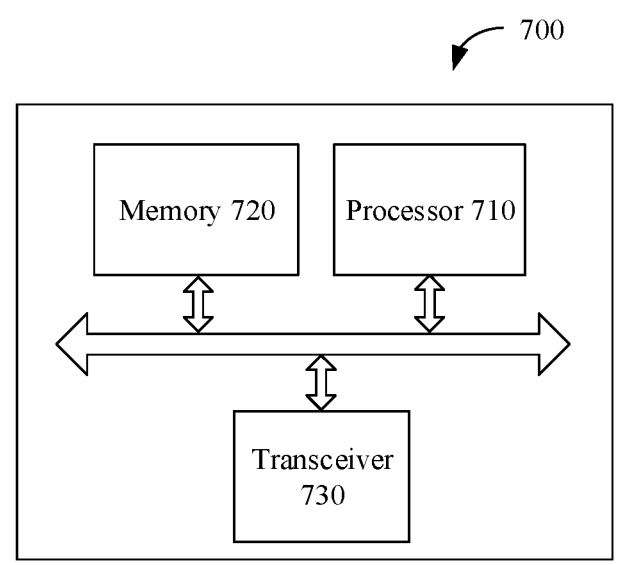
FIG. 7 is another schematic block diagram of a terminal device according to an embodiment of this application.

FIG. 7 is another schematic block diagram of a terminal device 700 according to an embodiment of this application. As shown in the figure, the terminal device 700 may include a processor 710. Optionally, the terminal device 700 further includes a memory 720. Optionally, the terminal device 700 further includes a transceiver 730. The processor 710, the memory 720, and the transceiver 730 may communicate with each other through an internal connection channel to transmit a control signal and/or a data signal. The memory 503 is configured to store a computer program. The processor 710 is configured to invoke the computer program from the memory 720 and run the computer program, to control the transceiver 720 to receive and send a signal.

Specifically, the terminal device 700 may correspond to the terminal device in the signal receiving method 400 according to the embodiments of this application. The terminal device 700 may include units configured to perform the method performed by the terminal device in the signal receiving method 400 in FIG. 5. The processor 710 may be configured to perform step 410 to step 440 in the embodiment shown in FIG. 5, and the transceiver 730 may be configured to perform step 450 in the embodiment shown in FIG. 5. In addition, the units in the terminal device 700 and the foregoing other operations and/or functions are respectively intended to implement a corresponding procedure of the signal receiving method 400 in FIG. 5. For brevity, details are not described herein.

In a possible design, the processor 710 may correspond to the processor 130 in the mobile phone shown in FIG. 1, the memory may correspond to the memory 140 in the mobile phone shown in FIG. 1, and the transceiver 730 may correspond to the radio frequency circuit 110 in the mobile phone shown in FIG. 1.

It should be understood that the processor may implement, in a plurality of manners, the functions shown in the foregoing method embodiments. For example, the processor may perform, in a first manner, namely, in a manner of executing a program stored in the memory, some or all of the steps performed by the terminal device in the foregoing method embodiments, or may perform, in a second manner, namely, in a manner of combining an integrated logical circuit of hardware in the processor with an instruction, some or all of the steps performed by the terminal device in the foregoing method embodiments, or certainly may perform, with reference to the first manner and the second manner, some or all of the steps performed by the terminal device in the foregoing method embodiments.

It should be further understood that, in the embodiments of this application, the processor may be a central processing unit (CPU), or may further be another general purpose processor, a digital signal processor (DSP), an application-specific integrated circuit (ASIC), a field programmable gate array (FPGA), or another programmable logic device, discrete gate or transistor logical device, discrete hardware component, or the like. The general purpose processor may be a microprocessor, or the processor may be any conventional processor, or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitative description, many forms of random access memory (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

According to the method provided in the embodiments of this application, this application further provides a computer program product, and the computer program product includes computer program code. When the computer program code is run on a terminal device, the terminal device performs the method in the embodiment shown in FIG. 5.

According to the method provided in the embodiments of this application, this application further provides a computer-readable medium, and the terminal device-readable medium includes computer program code. When the computer program code is run on a terminal device, the terminal device performs the method in the embodiment shown in FIG. 5.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal receiving method, wherein the method is applied to a terminal device provided with a plurality of subscriber identification module (SIM) cards including at least a first SIM card and a second SIM card, the first SIM card works in a first network and the second SIM card works in a second network, the terminal device is provided with at least one radio frequency resource and at least one baseband resource, a resource scheduling mode of the terminal device is selected from a plurality of resource scheduling modes including at least a first mode and a second mode, and the method comprises:

determining that the terminal device is to receive a high priority signal at a future time characterized by a start

37 time and an end time, wherein before the start time the resource scheduling mode of the terminal device is the first mode;

switching the resource scheduling mode of the terminal device at or before the start time from the first mode to the second mode responsive to detecting that a channel environment of the first SIM card meets a preset condition, or maintaining the resource scheduling mode of the terminal device as the first mode between the start time and the end time responsive to detecting that the channel environment of the first SIM card does not meet the preset condition; and receiving the high priority signal between the start time and the end time, wherein:

the high-priority signal comprises a paging message, a system message, or downlink signaling in a signaling interaction procedure comprising a cell handover procedure or switching a SIM card from an idle mode to a connected mode, and a quantity of receive antennas in the at least one radio frequency resource configured for the first SIM card in the second mode is greater than a quantity of receive antennas configured for the first SIM card in the first mode.

2. The method according to claim 1, wherein the first network is a $3^{rd}$ Generation (3G) network and the second network is a $4^{th}$ Generation (4G) network.

3. The method according to claim 1, wherein the preset condition comprises at least one of:

a signal-to-noise ratio (SNR) of a signal in the channel environment is less than or equal to a first preset threshold; or a received energy of the signal is less than or equal to a second preset threshold.

4. The method according to claim 1, wherein the first mode is a dual receive dual SIM dual standby (DR-DSDS) mode, and the second mode is a dual SIM dual standby (DSDS) mode.

5. The method according to claim 1, wherein the terminal device is provided with 2N receive antennas, the method further comprising:

responsive to the terminal being configured in accordance with the first mode, receiving downlink data by a first subset of N receive antennas configured for the first SIM card, and receiving additional downlink data by a second subset of N receive antennas configured for the second SIM card; or responsive to the terminal being configured in accordance with the second mode, receiving the downlink data by 2N receive antennas configured for the first SIM card.

6. The method according to claim 1, wherein the terminal device comprises two radio frequency resources configured to receive signals in the network, and each radio frequency resource comprises one or more receive antennas.

7. An electronic device, comprising:

a plurality of subscriber identification module (SIM) cards including at least a first SIM card and a second SIM card, wherein the first SIM card works in a first network and the second SIM card works in a second network;

at least one radio frequency resource and at least one baseband resource;

at least one processor; and a memory coupled to the at least one processor and storing programming instructions that, when executed by the at least one processor, cause the electronic device to schedule resources for the plurality of SIM cards by:

determining that the electronic device is to receive a high priority signal at a future time characterized by a start time and an end time, wherein before the start time a resource scheduling mode of the electronic device is a first mode;

switching the resource scheduling mode of the electronic device at or before the start time from the first mode to a second mode responsive to detecting that a channel environment of the first SIM card meets a preset condition; or maintaining the resource scheduling mode of the electronic device as the first mode between the start time and the end time responsive to detecting that the channel environment of the first SIM card does not meet the preset condition; and receiving the high priority signal between the start time and the end time, wherein the high-priority signal comprises a paging message, a system message, or downlink signaling in a signaling interaction procedure comprising a cell handover procedure or switching a SIM card from an idle mode to a connected mode, and wherein a quantity of receive antennas in the at least one radio frequency resource configured for the first SIM card in the second mode is greater than a quantity of receive antennas configured for the first SIM card in the first mode.

8. The electronic device according to claim 7, wherein the first network is a $3^{rd}$ Generation (3G) network and the second network is a $4^{th}$ Generation (4G) network.

9. The electronic device according to claim 7, wherein the preset condition comprises at least one of:

a signal-to-noise ratio (SNR) of a signal in the channel environment is less than or equal to a first preset threshold; or a received energy of the signal is less than or equal to a second preset threshold.

10. The electronic device according to claim 7, wherein the electronic device is a terminal, the first mode is a dual receive dual SIM dual standby (DR-DSDS) mode, and the second mode is a dual SIM dual standby (DSDS) mode.

11. The electronic device according to claim 7, wherein the electronic device is provided with 2N receive antennas, and wherein:

responsive to the electronic device being configured in accordance with the first mode, the electronic device is further configured to: receive downlink data by a first subset of N receive antennas configured for the first SIM card, and receive additional downlink data by a second subset of N receive antennas configured for the second SIM card; or responsive to the electronic device being configured in accordance with the second mode, the electronic device is further configured to: receive downlink data by the 2N receive antennas configured for the first SIM card.

12. The electronic device according to claim 7, wherein the terminal device comprises two radio frequency resources configured to receive signals in the network, and each radio frequency resource comprises one or more receive antennas.

13. A non-transitory computer-readable storage medium, comprising an instruction, wherein when the instruction is run on a terminal device comprising a plurality of subscriber identification module (SIM) cards including at least a first SIM card that works on a first network and a second SIM card that works on a second network, the terminal device is enabled to perform resource scheduling of the terminal device by:
  determining that the terminal device is to receive a high priority signal at a future time characterized by a start time and an end time, wherein before the start time a resource scheduling mode of the terminal device is a first mode;
  switching the resource scheduling mode of the terminal device at or before the start time from the first mode to a second mode responsive to detecting that a channel environment of the first SIM card meets a preset condition, or
  maintaining the resource scheduling mode of the terminal device as the first mode between the start time and the end time responsive to detecting that the channel environment of the first SIM card does not meet the preset condition; and
  receiving the high priority signal between the start time and the end time,
wherein:
  the high-priority signal comprises a paging message, a system message, or downlink signaling in a signaling interaction procedure comprising a cell handover procedure or switching a SIM card from an idle mode to a connected mode, and
  a quantity of receive antennas in the at least one radio frequency resource configured for the first SIM card in the second mode is greater than a quantity of receive antennas configured for the first SIM card in the first mode.

14. The non-transitory computer-readable storage medium according to claim 13, wherein the first network is a $3^{rd}$ Generation (3G) network and the second network is a $4^{th}$ Generation (4G) network.

15. The non-transitory computer-readable storage medium according to claim 13, wherein the preset condition comprises at least one of:
  a signal-to-noise ratio (SNR) of a signal in the channel environment is less than or equal to a first preset threshold; or
  a received energy of the signal is less than or equal to a second preset threshold.

16. The non-transitory computer-readable storage medium according to claim 13, wherein the first mode is a dual receive dual SIM dual standby (DR-DSDS) mode and the second mode is a dual SIM dual standby (DSDS) mode.

17. The non-transitory computer-readable storage medium according to claim 13, wherein the terminal device is provided with 2N receive antennas, and wherein the terminal device is enabled to perform:
  responsive to the terminal device being configured in accordance with the first mode, the terminal device is configured to receive downlink data by a first subset of N receive antennas configured for the first SIM card, and
  configured to receive additional downlink data by a second subset of N receive antennas configured for the second SIM card; or
  responsive to the terminal device being configured in accordance with the second mode, the terminal device is configured to receive the downlink data by the 2N receive antennas configured for the first SIM card.

18. The non-transitory computer-readable storage medium according to claim 13, wherein the terminal device comprises two radio frequency resources configured to receive signals in the network, and each radio frequency resource comprises one or more receive antennas.

* * * * *

UNITED STATES PATENT AND TRADEMARK OFFICE
CERTIFICATE OF CORRECTION

PATENT NO. : 11,595,808 B2
APPLICATION NO. : 17/058540
DATED : February 28, 2023
INVENTOR(S) : Li et al.

It is certified that error appears in the above-identified patent and that said Letters Patent is hereby corrected as shown below:

In the Claims

Claim 7: Column 38, Line 12: "condition;" should read -- condition, --.

Signed and Sealed this
Thirtieth Day of May, 2023

Katherine Kelly Vidal
*Director of the United States Patent and Trademark Office*